United States Patent
Avanessians et al.

(10) Patent No.: US 11,921,876 B1
(45) Date of Patent: Mar. 5, 2024

(54) ORGANIZATION-LEVEL GLOBAL DATA OBJECT ON DATA PLATFORM

(71) Applicant: Snowflake Inc., Bozeman, MT (US)

(72) Inventors: Christine A. Avanessians, Walnut Creek, CA (US); Damien Carru, New York, NY (US); Ramachandran Natarajan Iyer, Fremont, CA (US); Eric Karlson, Alameda, CA (US); Dennis Edgar Lynch, San Carlos, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/334,864

(22) Filed: Jun. 14, 2023

(51) Int. Cl.
*G06F 21/62* (2013.01)
*G06F 21/31* (2013.01)

(52) U.S. Cl.
CPC .......... *G06F 21/6218* (2013.01); *G06F 21/31* (2013.01)

(58) Field of Classification Search
CPC .............................. G06F 21/6218; G06F 21/31
See application file for complete search history.

(56) References Cited

U.S. PATENT DOCUMENTS

| | | | | |
|---|---|---|---|---|
| 5,560,005 A * | 9/1996 | Hoover | ................. | G06F 16/245 |
| 7,072,911 B1 * | 7/2006 | Doman | ................... | G06F 16/27 |
| | | | | 707/999.2 |
| 7,409,428 B1 * | 8/2008 | Brabec | ................. | H04L 65/102 |
| | | | | 709/248 |
| 8,635,271 B1 * | 1/2014 | Adya | .................. | H04L 67/5683 |
| | | | | 709/217 |
| 9,172,699 B1 * | 10/2015 | Vazquez | ............. | H04L 63/0861 |
| 9,774,626 B1 * | 9/2017 | Himler | ............... | H04L 63/1483 |
| 9,847,973 B1 * | 12/2017 | Jakobsson | ........... | H04L 63/0245 |
| 10,057,197 B1 * | 8/2018 | Ritchie | .................... | H04W 4/14 |
| 10,133,866 B1 * | 11/2018 | Kumar | .................. | G06F 21/565 |
| 10,397,624 B1 * | 8/2019 | Largman | .......... | H04N 21/42204 |
| 10,680,986 B1 * | 6/2020 | Wu | ....................... | H04L 51/043 |
| 10,791,119 B1 * | 9/2020 | Coleman | ............ | H04L 63/0884 |
| 10,880,322 B1 * | 12/2020 | Jakobsson | ............... | H04L 51/08 |
| 11,019,076 B1 * | 5/2021 | Jakobsson | ............... | H04L 51/42 |
| 11,102,244 B1 * | 8/2021 | Jakobsson | ............... | H04L 51/42 |
| 11,137,886 B1 * | 10/2021 | Richards | ................. | H04L 67/53 |
| 11,175,806 B1 * | 11/2021 | McCue | ................. | G06F 3/0481 |
| 11,539,791 B1 * | 12/2022 | Mikolajczuk | ....... | G06F 16/2282 |
| 11,567,908 B1 | 1/2023 | Cline et al. | | |
| 11,599,512 B1 | 3/2023 | Liu | | |
| 11,614,924 B1 | 3/2023 | Agrawal et al. | | |
| 11,620,310 B1 | 4/2023 | Akidau et al. | | |

(Continued)

OTHER PUBLICATIONS

"U.S. Appl. No. 18/352,059, Non Final Office Action dated Sep. 28, 2023", 6 pages.

(Continued)

*Primary Examiner* — Aravind K Moorthy

(74) *Attorney, Agent, or Firm* — Schwegman Lundberg & Woessner, P.A.

(57) ABSTRACT

Provided herein are systems and methods for global data objects on a data platform where the global data objects are accessible at an organization level. In particular, an organization-level global data object provided by various embodiments can be used as a generic organization object that is owned by a specific organization, and can be managed (e.g., created, deleted, or modified) by use of a leader-based model.

30 Claims, 8 Drawing Sheets

(56) References Cited

U.S. PATENT DOCUMENTS

| | | | |
|---|---|---|---|
| 11,752,433 B2* | 9/2023 | Kung | G10L 15/22 |
| 11,757,914 B1* | 9/2023 | Jakobsson | H04L 63/1425 |
| | | | 726/25 |
| 11,764,950 B2 | 9/2023 | Padmanabhan | |
| 11,765,035 B2 | 9/2023 | Gunda et al. | |
| 2002/0049818 A1* | 4/2002 | Gilhuly | H04W 12/04 |
| | | | 709/217 |
| 2004/0044780 A1* | 3/2004 | Eastham | H04L 67/104 |
| | | | 709/229 |
| 2004/0139158 A1* | 7/2004 | Datta | A63F 13/12 |
| | | | 709/205 |
| 2004/0199486 A1* | 10/2004 | Gopinath | G06F 16/27 |
| 2005/0172121 A1* | 8/2005 | Risan | G06F 21/60 |
| | | | 726/26 |
| 2007/0038719 A1* | 2/2007 | Brown | H04L 63/126 |
| | | | 709/207 |
| 2007/0123307 A1* | 5/2007 | Adams | H04L 51/214 |
| | | | 455/566 |
| 2007/0180151 A1* | 8/2007 | Richardson | H04L 67/12 |
| | | | 709/248 |
| 2007/0266208 A1* | 11/2007 | Kim | H04L 63/0442 |
| | | | 711/206 |
| 2007/0271310 A1* | 11/2007 | Han | G06F 16/275 |
| 2010/0293015 A1* | 11/2010 | Coglianese | G06Q 30/0201 |
| | | | 705/7.29 |
| 2012/0042391 A1* | 2/2012 | Risan | H04N 21/4627 |
| | | | 726/28 |
| 2012/0173635 A1* | 7/2012 | Wormald | G06Q 10/107 |
| | | | 709/206 |
| 2013/0174234 A1* | 7/2013 | Yang | H04L 63/083 |
| | | | 726/6 |
| 2015/0161412 A1* | 6/2015 | Price | G06F 16/13 |
| | | | 707/609 |
| 2015/0264143 A1* | 9/2015 | Wiesen | H04W 4/08 |
| | | | 370/312 |
| 2015/0310664 A1* | 10/2015 | Boussard | G06T 19/006 |
| | | | 345/633 |
| 2016/0150010 A1* | 5/2016 | Takase | G06F 3/067 |
| | | | 709/219 |
| 2016/0294748 A1* | 10/2016 | Yang | G06Q 10/107 |
| 2016/0352816 A1* | 12/2016 | Xiao | H04W 4/21 |
| 2017/0324684 A1* | 11/2017 | Dharmapalan | G06Q 10/107 |
| 2018/0034750 A1* | 2/2018 | Wang | H04L 12/18 |
| 2018/0152397 A1* | 5/2018 | Tang | H04L 51/04 |
| 2018/0152471 A1* | 5/2018 | Jakobsson | H04L 63/1425 |
| 2018/0157795 A1* | 6/2018 | DeJana | G16H 10/60 |
| 2018/0198878 A1* | 7/2018 | Keldenich | H04L 67/563 |
| 2018/0207528 A1* | 7/2018 | Palikuqi | H04L 67/1095 |
| 2018/0359288 A1* | 12/2018 | Wang | H04L 65/1069 |
| 2019/0098056 A1* | 3/2019 | Pitre | G06F 21/6218 |
| 2019/0146711 A1* | 5/2019 | Scholl | G06F 3/065 |
| | | | 714/764 |
| 2019/0266178 A1* | 8/2019 | Madhavan | G06F 16/2365 |
| 2019/0347067 A1* | 11/2019 | Jolfaei | G06F 3/167 |
| 2020/0028815 A1* | 1/2020 | He | H04L 51/52 |
| 2020/0036667 A1* | 1/2020 | Talton | H04L 12/185 |
| 2020/0065117 A1* | 2/2020 | Krum | G06F 9/468 |
| 2020/0201840 A1* | 6/2020 | Pfeiffer | G06F 16/2365 |
| 2020/0213405 A1* | 7/2020 | Goenka | H04L 51/214 |
| 2020/0274876 A1* | 8/2020 | Mathew | G06F 21/6218 |
| 2020/0351192 A1* | 11/2020 | Murao | G06F 11/3688 |
| 2020/0366678 A1* | 11/2020 | Mutha | H04L 63/0815 |
| 2020/0402048 A1* | 12/2020 | Cluxton | G06Q 20/40 |
| 2021/0021563 A1* | 1/2021 | Hegde | H04L 47/286 |
| 2021/0089357 A1* | 3/2021 | Garaga | G06F 9/5072 |
| 2021/0173493 A1* | 6/2021 | Barzilay | G06F 3/0482 |
| 2022/0006771 A1* | 1/2022 | Tack | H04L 12/1818 |
| 2022/0012645 A1* | 1/2022 | Ying | G06N 20/20 |
| 2022/0061023 A1* | 2/2022 | Xu | H04W 8/245 |
| 2022/0078797 A1* | 3/2022 | Helms | G06F 3/02 |
| 2022/0287089 A1* | 9/2022 | Singh | H04W 72/51 |
| 2022/0292080 A1* | 9/2022 | Rao | G06F 16/2358 |
| 2022/0417251 A1* | 12/2022 | Gilbert | G06Q 10/063118 |
| 2023/0051206 A1 | 2/2023 | Gunda et al. | |
| 2023/0107925 A1 | 4/2023 | Collver | |
| 2023/0125747 A1 | 4/2023 | Kherani et al. | |
| 2023/0138870 A1 | 5/2023 | Buscaglia et al. | |
| 2023/0168971 A1 | 6/2023 | Mehta et al. | |
| 2023/0169466 A1 | 6/2023 | Prakash et al. | |
| 2023/0169608 A1 | 6/2023 | Suryanarayana et al. | |
| 2023/0177481 A1 | 6/2023 | Motlagh | |
| 2023/0185825 A1 | 6/2023 | Gernhardt et al. | |
| 2023/0188431 A1 | 6/2023 | Esposito et al. | |
| 2023/0214753 A1 | 7/2023 | Eidelman et al. | |
| 2023/0214949 A1 | 7/2023 | Eidelman et al. | |
| 2023/0231822 A1* | 7/2023 | Cuan | H04L 51/212 |
| | | | 704/9 |
| 2023/0244671 A1 | 8/2023 | Gunda et al. | |
| 2023/0247088 A1* | 8/2023 | Kondratiev | H04L 67/10 |
| | | | 709/201 |
| 2023/0259616 A1* | 8/2023 | Rodriguez Bravo | G06F 21/552 |
| | | | 726/23 |
| 2023/0259647 A1 | 8/2023 | Yip et al. | |
| 2023/0281278 A1 | 9/2023 | Fernandez Garcia et al. | |
| 2023/0281343 A1 | 9/2023 | Buscaglia et al. | |
| 2023/0281698 A1* | 9/2023 | Anaparthi | G06Q 30/0611 |
| | | | 705/26.82 |

OTHER PUBLICATIONS

"U.S. Appl. No. 18/352,059, Notice of Allowance dated Dec. 22, 2023", 9 pgs.

"U.S. Appl. No. 18/352,059, Response filed Dec. 5, 2023 to Non Final Office Action dated Sep. 28, 2023", 11 pgs.

* cited by examiner

ORGANIZATION-LEVEL GLOBAL DATA OBJECT ON DATA PLATFORM

TECHNICAL FIELD

Embodiments of the disclosure relate generally to databases and, more specifically, to a global data object on a data platform where the global data object is accessible at an organization level.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
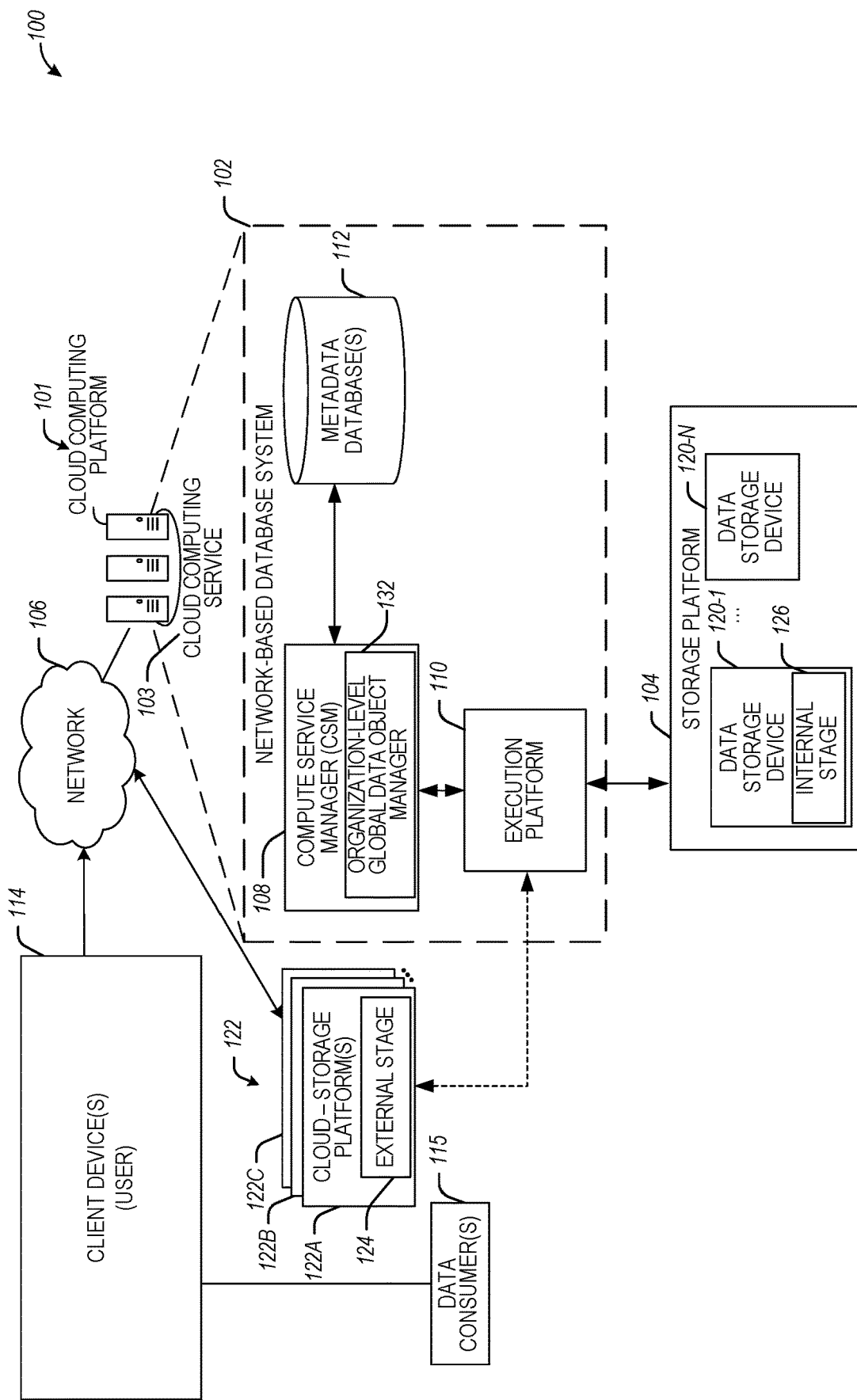
FIG. 1 illustrates an example computing environment including a network-based database system which is in communication with a cloud storage platform and is using an organization-level global data object manager that supports organization-level global data objects, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in user accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, on, etc.) what is referred to herein as an "internal storage location." If stored external to the data platform, a given file is referred to herein as an "external file" and is referred to as being stored in (or at, on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a user account. The data platform may include one or more databases that are respectively maintained in association with any number of user accounts (e.g., accounts of one or more data providers or other types of users), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular user accounts as well. Users and/or executing processes that are associated with a given user account may, via one or more types of clients, be able to cause data to be ingested into the database, and may also be able to manipulate the data, add additional data, remove data, run queries against the data, generate views of the data, and so forth.

In an implementation of a data platform, a given database (e.g., a database maintained for a user account) may reside as an object within, e.g., a user account, which may also include one or more other objects (e.g., users, roles, privileges, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

A data platform (e.g., database system) can support data storage for one or more different organizations (e.g., customer organizations, which can be individual companies or business entities), where each individual organization can have one or more accounts (e.g., customer accounts) associated with the individual organizations, and each account can have one or more users (e.g., unique usernames or logins with associated authentication information). Additionally, an individual account can have one or more users that are designated as an administrator for the individual account. An individual account of an organization can be associated with a specific cloud platform (e.g., cloud-storage platform, such as such as AMAZON WEB SERVICES™ (AWS™), MICROSOFT® AZURE®, GOOGLE CLOUD PLATFORM™), one or more servers or data centers servicing a specific region (e.g., geographic regions such as North America, South America, Europe, Middles East, Asia, the Pacific, etc.), a specific version of a data platform, or a combination thereof. A user of an individual account can be unique to the account. Additionally, a data platform can use an organization data object to link accounts associated with (e.g., owned by) an organization, which can facilitate management of objects associated with the organization, account management, billing, replication, failover/failback, data sharing within the organization, and the like.

At present, an individual data object that exists at an organization level (hereafter, an organization-level data object) is owned by, created under, and exists under a specific account (e.g., source account) of the organization on a source deployment (e.g., SoT deployment) of a data platform, and a read-only copy of the organization-level data object is locally maintained (e.g., locally stored) on all deployments of a data platform. If the first deployment on which the specific account (e.g., source account) goes down or is otherwise unavailable, or if the specific account is deleted or removed, the SoT for the individual organization-level data object is unavailable and the organization-level data object cannot be modified (e.g., edited or deleted) by accounts on the participants deployments.

Aspects of the present disclosure provide techniques that implement a global data object at an organizational-level (or an organization-level global data object) on a data platform (e.g., data platform comprising multiple deployments), where the global data object is accessible at an organization level. In particular, an organization-level global data object provided by various embodiments can be used as a generic organization object that is owned by a specific organization but not owned by any specific account of the specific organization. For some embodiments, ownership of an organization-level global data object by a specific organization is implemented by having an organization-level account, of the specific organization, owning the organization-level global data object. By way of an organization-level account of a specific organization, an organization-level global data object owned by the specific organization can be managed by one or more users of the organization-level account. Additionally, various embodiments implement support for a leader-based model to manage the organization-level global data object. By use of a leader-based model, various embodiments ensure that an organizational-level global data object of a specific organization can be written to, or read from, any deployment associated having an account of the specific organization. The leader-based model enables some embodiments to be resilient to failures without loss of committed data. The leader-based model enables various embodiments to manage an organizational-level global data object of a specific organization to be managed via a global control plane that is not tied to any specific account (e.g., any non-organization-level account) of the specific organization. Additionally, the leader-based model enables some embodiments to operate on an organizational-level global data object of a specific organization at a latency that is similar to (or close to) operating on a local data object.

According to some embodiments, once created on a data platform in connection with a specific organization, an organization-level global data object of the specific organization can be accessible by any account of the specific organization, and can be accessed by any account of the specific organization regardless of where that account resides (e.g., regardless of what deployment the account resides on). For some embodiments, an organization-level account of a specific organization exists (e.g., only one exists per an organization) and is designated with privileges (e.g., administrative privileges) to manipulate an organization-level global data object, and deployments of all other accounts (e.g., non-organization-level accounts) receive a full copy (e.g., full snapshot) of the organization-level global data object, so that those other accounts can locally access (e.g., read from) the full copy on their respective deployment. Specifically, for various embodiments, an organization-level global data object of a specific organization is created on and resides on a single deployment (hereafter, referred to as a SoT deployment) of the specific organization, and all other deployments (hereafter, participant deployments) having at least one account of the specific organization receive and maintain a full copy (or full snapshot) of the organization-level global data object. The SoT deployment can also be regarded as a leader deployment (or leader) with respect to the organization-level global data object of the specific organization. A copy of an organization-level global data object can be copied (e.g., replicated) from a SoT deployment of the organization-level global data object to each participant deployment. Use of an embodiment can ensure that organization-level global data objects of a specific organization do not need to broadcast outside of deployments of the specific organization.

For various embodiments, a SoT deployment for an organization-level global data object is the only deployment capable of facilitating the editing or deleting of the organization-level global data object for the specific organization. A change (e.g., edit) of an organization-level global data object initiated from the SoT deployment can be applied to a copy of the organization-level global data object local to the SoT deployment. A change (e.g., edit) of an organization-level global data object initiated from a participant deployment can comprise first sending a change request to the SoT deployment by way of a message (e.g., global message) from the participant deployment. In this way, the SoT deployment can serve as a leader for a set of participant deployments.

During operation, a SoT deployment can receive (e.g., from a user on the SoT deployment or a user on a participant deployment) a request for a change to an organization-level global data object. To apply the change, the SoT deployment can generate a new request message (e.g., global request message) and send the request message all participant deployments. The request message can comprise one or more of: a full copy (e.g., snapshot) of the organization-level global data object with the one or more changes being proposed; a full copy (e.g., snapshot) of the organization-level global data object prior to the one or more changes proposed (e.g., provided if the initial organization-level global data object needs to be found by the participant deployment receiving the request message); or a flag (or other indicator) that indicates a desired action (e.g., create, delete, modify/alter) to be taken by the participant deployment receiving the request message. Depending on the embodiment, after the SoT deployment commits (or attempts to commit) the change (e.g., action) on the SoT deployment, the SoT deployment transmits a follow-up message (e.g., global follow-up message) to all the participant deployments. After the follow-up message (e.g., global follow-up message) is transmitted to all the participant deployments, the change (e.g., action) can be considered committed on the SoT deployment (e.g., considered part of, or persistent with respect to, the SoT).

Alternatively, after the SoT deployment commits (or attempts to commit) the change (e.g., action) on the SoT deployment, the SoT deployment can first receives an acknowledgement of success from a quorum of participant deployments prior to the SoT committing the change on the SoT. The quorum can be defined, for example, as a majority of participant deployments or by some other percentage value. The SoT deployment can determine whether a quorum has been reached by having each individual participant deployment send a response message (e.g., global response message) that indicates if the individual participant deployment successfully committed the change (requested by the request message) locally at the individual participant deployment. The SoT can monitor for response messages from participant deployments and count the number of response messages received that indicate a successful commitment at a participant deployment. For instance, the monitoring can be facilitated by a watch process that monitors for the response messages for a predetermined amount of time (e.g., 30 second monitor/watch time) and counts how many response messages indicating success are received in the predetermined amount of time. A configurable timeout can determine the predetermined amount of time the SoT deployment waits for a quorum to be reached before the SoT deployment considers the commitment of the change a failure (e.g., and reverses the change to its local organization-level global data object or does not execute a commitment step). If the SoT deployment determines a quorum has been reached, the SoT can commit (or attempt to commit) the change locally on the SoT deployment. Thereafter, the SoT deployment can transmit a follow-up message (e.g., global follow-up message) to the participant deployments.

The follow-up message can indicate the result of commitment (e.g., success or failure) of the change on the SoT deployment. Additionally, the follow-up message can comprise one or more of: a full copy (e.g., snapshot) of the organization-level global data object with the final state after the commitment; a full copy (e.g., snapshot) of the organization-level global data object prior to the one or more changes proposed (e.g., provided if the initial organization-level global data object needs to be found by the participant deployment receiving the request message); and a flag (or other indicator) that indicates a desired action (e.g., create, delete, modify/alter) to be taken by the participant deployment receiving the request message.

Use of a SoT deployment can enable serialization of changes (e.g., edits) being applied to an organization-level global data object, and can support both local and remote changes that permit a write-anywhere model. Depending on the embodiment, a request to modify a specified set of organization-level global data objects can be limited to requests by the SoT deployment; a request to modify a specified set of organization-level global data objects can be limited to requests by only a participant deployment' and a request to modify a specified set of organization-level global data objects can be open to either a SoT deployment or a participant deployment.

According to some embodiments, a SoT deployment for a specific organization serves as a SoT for all organization-level global data objects of a specific organization. Alternatively, for some embodiments, different deployments serve as a SoT for different sets of organization-level global data objects. For example, a first deployment can exclusively serve as a SoT for a first set of organization-level global data objects at a given time, and a second (different) deployment can exclusively serve as a SoT for a second set of organization-level global data objects at a given time.

For various embodiments, for a specific organization, a SoT role for a set of organization-level global data objects can be moved from a current SoT deployment to one of the participant deployments, where the participant deployment has at least one account of the specific organization that resides on the participant deployment (e.g., where an organization-level account of the specific organization may or may not be residing on the participant deployment). Depending on the embodiment, the movement of the SoT role can occur only after ensuring that all organization-level global data objects of a specific organization are consistent between the current SoT deployment and all participant deployments. The movement of the SoT role from the current SoT deployment to one of the participant deployments occurs when, for example, the current SoT deployment experiences a failure or experiences downtime (e.g., scheduled downtime for maintenance), two organizations merge and the SoT moves deployments as a result, or the SoT moves due to a change in security or data policy (e.g., government compliance). For instance, where a specific organization (e.g., customer organization) spans multiple deployments, when a region of deployments goes down, an embodiment can cause a shift of the SoT to another deployment and allow continuity of organization-level global data objects.

According to some embodiments, the participant deployment determined (e.g., selected or elected) to be a new SoT can be determined based on a consensus methodology, such as one based on Paxos (a family of protocols for solving consensus in a network of nodes) or on Raft (a consensus algorithm that serves as an alternative to Paxos).

Depending on the embodiment, a given organization-level global data object can comprise a data object for a table, a schema, a view, a stream, a task, a user, a role, or the like (e.g., which can be available for access by accounts of an organization at an organization level). Furthermore, various embodiments facilitate consistency of edits to organization-level global data objects across a SoT deployment and one or more participant deployments, where upon reaching consistency of a given edit to a given organization-level global data object, the given organization-level global data object on the SoT deployment and the full copies of the given organization-level global data object at participant deployments are consistent, and any participant deployment can operate on their respective full copy of the given organization-level global data object knowing that its full copy is consistent with the SoT deployment. In general, various embodiments described herein provide a foundational framework for implementing one or more organization-level global data objects for different organizations on a data platform.

As used herein, a global data object at an organizational-level (also referred to herein as an organization-level global data object) is a system level data object that is scoped to all of a specific organization and accounts associated with the specific organization. Accordingly, for various embodiments, an organization-level global data object of a specific organization is not tied to any specific account (e.g., to any specific non-organization-level account) of the specific organization. In this way, an organization-level global data object can be freely moved around or replicated within one or more accounts of the specific organization or can facilitate easy failover of the organization-level global data object. Additionally, for some embodiments, an organization-level global data object is tied to the specific organization by exclusively tying the organization-level global data object to an organization-level account of the specific organization.

As used herein, a deployment (e.g., of a data platform) can comprise a location, a database vendor, a database provider, a computing device, or some combination thereof, where database data (e.g., comprising one or more data objects) is replicated. For instance, for some embodiments, an organization-level global data object associated with a specific organization is replicated at each deployment associated with the specific organization. Generally, multiple deployments can provide different benefits to a database client, such as data being backed up at more than one deployment or faster data access based on geographic or network proximity of a given deployment to the database client. For instance, in the event that one deployment is unavailable due to a power outage, a system error, a scheduled maintenance downtime, or the like, a failover process can ensure a different deployment can take over the management and operation of the database.

As used herein, a SoT deployment (e.g., of a data platform) for an organization can refer to a deployment that serves as a SoT for one or more organization-level global data objects associated with the organization, and a participant deployment (e.g., of the data platform) associated with the organization can refer to a deployment where the one or more organization-level global data objects are replicated for access by the deployment. For some embodiments, the SoT deployment for an organization is the deployment where an organization-level account for the organization resides, where the organization-level account comprises one or more users that have organization-level privileges (e.g., administrative privileges) for managing or administering accounts of the organization that do not have organization-level access (hereafter, non-organization-level account). Additionally, for some embodiments, a participant deployment is any deployment on which at least one account associated with the organization resides.

As used herein, an organization-level global data object change can comprise creation of an organization-level global data object, deletion of an organization-level global data object, or a modification of an organization-level global data object. A request for an organization-level global data object change (e.g., from a deployment) can comprise one or more statements expressed in Data Definition Language (DDL) or Structured Query Language (SQL).

According to some embodiments, an organization-level global data object can comprise one or more data fields (or data attributes associated with the organization-level global data object) listed in following Table 1.

TABLE 1

| Field Name | Field Data Type | Description |
| --- | --- | --- |
| Domain | Long | Enumeration value describing the type of the organization-level global data object. |
| globalDeploymentId | Long | Global deployment identifier of the deployment where the organization-level global data object was originally created. |
| entityId | Long | Deployment-unique entity identifier for the object. |
| sourceOfTruthDeploymentId | Long | Deployment identifier for the SoT (the SoT deployment) for this organization-level global data object. This identifier can be mutable if the SoT (the SoT deployment) for this organization-level global data object changes. |
| ReplicationGroup | String | Identifies the specific organization the organization-level global data object belongs to. |
| ParentDomain | Long | Enumeration value describing the type of the parent data object. |
| ParentGlobalDeploymentId | Long | Global deployment identifier of the deployment where the parent data object of the organization-level global data object was created. |

TABLE 1-continued

| Field Name | Field Data Type | Description |
|---|---|---|
| parentEntityId | Long | Deployment-unique entity identifier for the parent data object. |
| Name | String | Name of the organization-level global data object. |
| CreatedOn | Long | Time (e.g., epoch-time) when the organization-level global data object was created. |
| UpdatedOn | Long | Time (e.g., epoch-time) when the organization-level global data object was last updated. |
| DeletedOn | Long | Time (e.g., epoch-time) when the organization-level global data object was deleted. |

For some embodiments, an organization-level global data object is uniquely identified by (e.g., a unique identifier comprising) a combination of two or more of field values of the organization-level global data object. For instance, the combination of two or more field values of the organization-level global data object can comprise: a Domain of the organization-level global data object; globalDeploymentId of the organization-level global data object; and entityId of the organization-level global data object. Additionally, for some embodiments, the combination of the name and domain is unique per parent data object. Depending on the embodiment, a Domain of an organization-level global data object can identify a data object type for the organization-level global data object. For example, the Domain of the organization-level global data object can identify that the organization-level global data object is an account data object, a user data object, a role data object, or the like. A ReplicationGroup of an organization-level global data object can identify a specific organization (e.g., by an identifier of the specific organization) to which the organization-level global data belongs (or is associated with).

For various embodiments, one or more of request messages (e.g., global request messages) from SoT deployments, response messages from participant deployments, and follow-up messages from SoT deployments are based on a messaging framework that can signal a data object has been created, deleted, or modified/altered. For instance, the messaging framework used can be similar to one that is used for data object replication across deployments of a data platform. Once a request message is sent from a SoT deployment to one or more participant deployments, a response message can be sent back from the one or more participant deployments, where the response message can indicate whether the request message was dispatched successfully or not. According to some embodiments, the structure of request messages can comprise one or more data fields listed in following Table 2.

TABLE 2

| Field Name | Field Data Type | Description |
|---|---|---|
| sourceDeploymentId | Long | Global deployment identifier of the SoT deployment where the request message is coming from. |

TABLE 2-continued

| Field Name | Field Data Type | Description |
|---|---|---|
| sourceJobId | Long | The identifier of the job that has initiated the change requested on the SoT deployment by the request message. |
| actionFlag | Integer | Enumeration value describing the action to be taken (e.g., CREATE, ALTER, DELETE). |
| entityDomain | Long | The domain describing the entity (type of the organization-level global data object) being changed. |
| entityDeploymentId | Long | Deployment identifier of the deployment where the organization-level global data object was originally created. |
| entityId | Long | Deployment-unique entity identifier for the organization-level global data object. |
| serializedEntityDPO | String | A serialized data persistent object (DPO) representing a current object (for creation/deletion action) or an old object (for modification action) being acted upon. |
| serializedChangeDPO | String | For modification actions, the serialized data persistent object (DPO) representing the changes. |

According to some embodiments, the structure of response messages can comprise one or more data fields listed in following Table 3.

TABLE 3

| Field Name | Field Data Type | Description |
|---|---|---|
| sendingDeploymentId | Long | Global deployment identifier of the participant deployment where the response message is coming from. |
| sourceJobId | Long | The identifier of the job that has initiated the change requested on the SoT deployment by the request message. This can align with the job identifier on the request message requesting the change (which can enable recovery of the initial request if necessary). |
| statusFlag | Integer | Enumeration value indicating the outcome of the change operation (e.g., by a CREATE, ALTER, DELETE action) requested at the participant deployment. |
| additionalInformation | String | Additional information (e.g., error messages, customer responses) that can be acted upon by the SoT to complete the change request operation. |

The various embodiments that are described herein are described with reference where appropriate to one or more of the various figures. An example computing environment with an organization-level global data object manager configured to perform the disclosed techniques is discussed in connection with FIGS. 1-3. Example deployments using organization-level global data objects are discussed in connection with FIG. 4-FIG. 6. Example functionalities associated with organization-level global data objects are discussed in connection with FIG. 7. A more detailed discussion of example computing devices that may be used with the disclosed techniques is provided in connection with FIG. 8.

FIG. 1 illustrates an example computing environment 100 including a network-based database system 102, which is in communication with a cloud storage platform and is using an organization-level global data object manager 132 that supports organization-level global data objects, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102 and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities. The cloud computing platform 101 may include a three-tier architecture: data storage (e.g., storage platform 104 and storage platforms 122), an execution platform 110 (e.g., providing query processing), and a compute service manager 108 providing cloud services including services associated with the disclosed functionalities.

It is often the case that organizations that are users of a given data platform also maintain data storage (e.g., a data lake) that is external to the data platform (i.e., one or more external storage locations). For example, a company could be a user of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™) MICROSOFT® AZURE®, GOOGLE CLOUD PLATFORM™, and/or the like. The user's servers and cloud-storage platforms are both examples of what a given user could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given user stores at a given external storage location may or may not be stored in an external stage in the external storage location; i.e., in some data-platform implementations, it is a user's choice whether to create one or more external stages (e.g., one or more external-stage objects) in the user's data-platform account as an organizational and functional construct for conveniently interacting via the data platform with one or more external files.

As shown, the network-based database system 102 of the cloud computing platform 101 is in communication with the storage platforms 104 and 122 (e.g., AWS®, Microsoft Azure Blob Storage®, or Google Cloud Storage). The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as a user device) may include one or more of a laptop computer, a desktop computer, a mobile phone (e.g., a smartphone), a tablet computer, a cloud-hosted computer, cloud-hosted serverless processes, or other computing processes or devices that may be used to access services provided by the cloud computing platform 101 (e.g., cloud computing service 103) by way of a network 106, such as the Internet or a private network. In some embodiments, the user of the client device 114 can be a data provider configured to provide services to other users such as data consumers 115.

In the description below, actions are ascribed to users of the network-based database system. Such actions shall be understood to be performed concerning client device 114 (or multiple client devices) operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user of the network-based database system shall be understood to include performing such actions by the cloud computing service 103 in response to an instruction from that user.

The compute service manager 108 is also coupled to one or more metadata databases 112 that store metadata about various functions and aspects associated with the network-based database system 102 and its users. For example, the one or more metadata databases 112 may include a summary of data stored in remote data storage systems as well as data available from a local cache. Additionally, the one or more metadata databases 112 may include information regarding how data is organized in remote data storage systems (e.g., the storage platform 104) and the local caches. Information stored by the one or more metadata databases 112 allows systems and services to determine whether a piece of data needs to be accessed without loading or accessing the actual data from a storage device. In some embodiments, the one or more metadata databases 112 are configured to store account object metadata (e.g., account objects used in connection with a replication group object).

Figure 3:
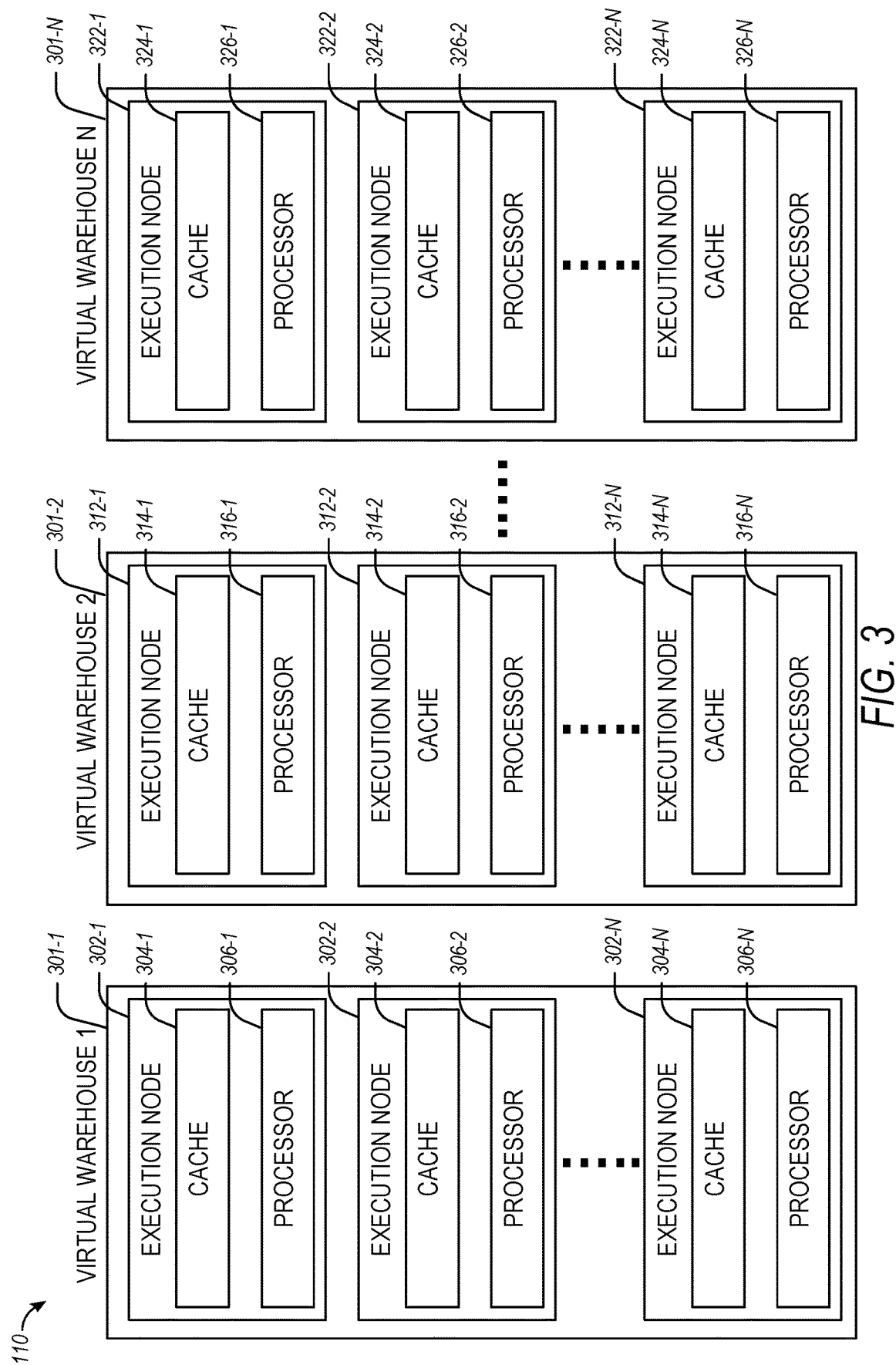
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud-storage platforms 122A, 122B, . . . , 122C (collectively referred to as storage platforms 122). The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the storage platform 104 may include distributed file systems (such as Hadoop Distributed File Systems (HDFS)), object storage systems, and the like. In some embodiments, at least one internal stage 126 may reside on one or more of the data storage devices 120-1-120-N, and an external stage 124 may reside on one or more of the storage platforms 122.

In some embodiments, the compute service manager 108 includes an organization-level global data object manger 132 that comprises suitable circuitry, interfaces, logic, and/or code and is configured to perform the disclosed functionalities associated with managing one or more organization-level global data objects, across deployments of the network-based database system 102, in connection with one or more organizations. For instance, the organization-level global data object manger 132 of some embodiments can implement (or otherwise support) an organization-level global data object change, such as creating, editing, or deleting an organization-level global data object of a specified organization, with respect to a SoT deployment (of the network-based database system 102) and one or more participant deployments (of the network-based database system 102). More regarding organization-level global data objects across deployments is discussed in connection with FIGS. 4-7.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, the one or more metadata databases 112, the execution platform 110, and the storage platform 104, are shown in FIG. 1 as individual discrete components. However, each of the compute service manager 108, the one or more metadata databases 112, execution platform 110, and storage platform 104 may be implemented as a distributed system (e.g., distributed across multiple systems/platforms at multiple geographic locations). Additionally, each of the compute service manager 108, the one or more metadata databases 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be good candidates for processing the task. Metadata stored in the one or more metadata databases 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the storage platform 104. Thus, the computing resources and cache resources are not restricted to specific data storage devices 120-1 to 120-N. Instead, all computing resources and all cache resources may retrieve data from, and store data to, any of the data storage resources in the storage platform 104.

Figure 2:
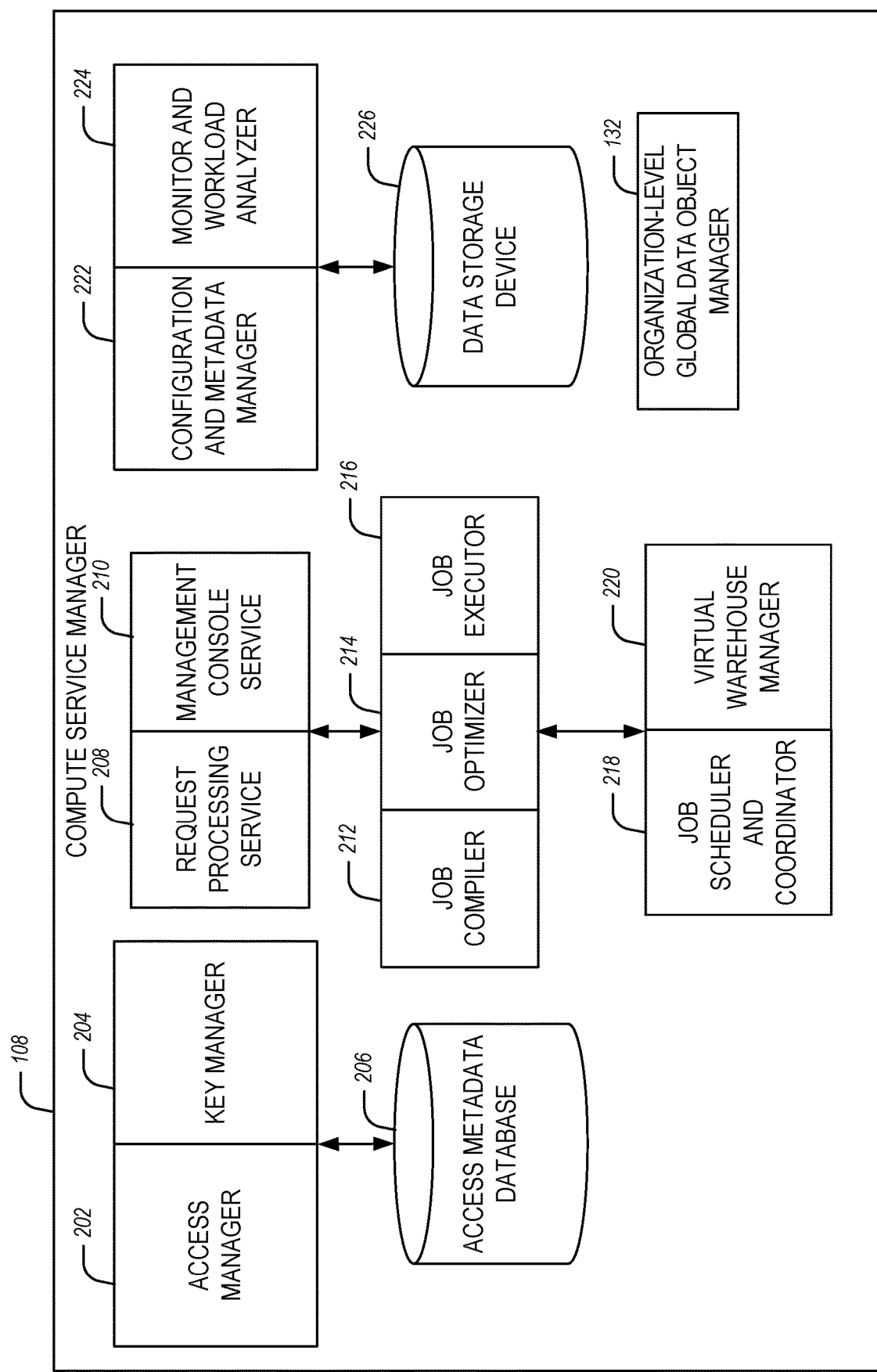
FIG. 2 is a block diagram illustrating the components of a compute service manager including an organization-level global data object manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to an access metadata database 206, which is an example of the one or more metadata databases 112. Access manager 202 handles authentication and authorization tasks for the systems described herein. The key manager 204 facilitates the use of remotely stored credentials to access external resources such as data resources in a remote storage device. As used herein, the remote storage devices may also be referred to as "persistent storage devices" or "shared storage devices." For example, the key manager 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the key manager 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs, such as user queries, that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes configuration and metadata manager 222, which manages the information related to the data stored in the remote data storage devices and the local buffers (e.g., the buffers in the execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in the execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1), and any such illicit communication can be recorded (e.g., in a log or other location). Also, the information stored on a given execution node is restricted to data relevant to the current query and any other data is unusable, rendered so by destruction or encryption where the key is unavailable.

As previously mentioned, the compute service manager 108 includes the organization-level global data object manager 132 configured to perform the disclosed functionalities associated with associated with managing one or more organization-level global data objects, across deployments, in connection with one or more organizations.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless concerning the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with execution platform 110, virtual warehouses 1, . . . , N may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

Execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In some embodiments, at least one of the execution nodes of execution platform 110 (e.g., execution node 302-1) can be configured with the organization-level global data object manager 132, which can facilitate management (e.g., creation, modification, or deletion) of one or more organization-level global data objects on the network-based database system.

Figure 4:
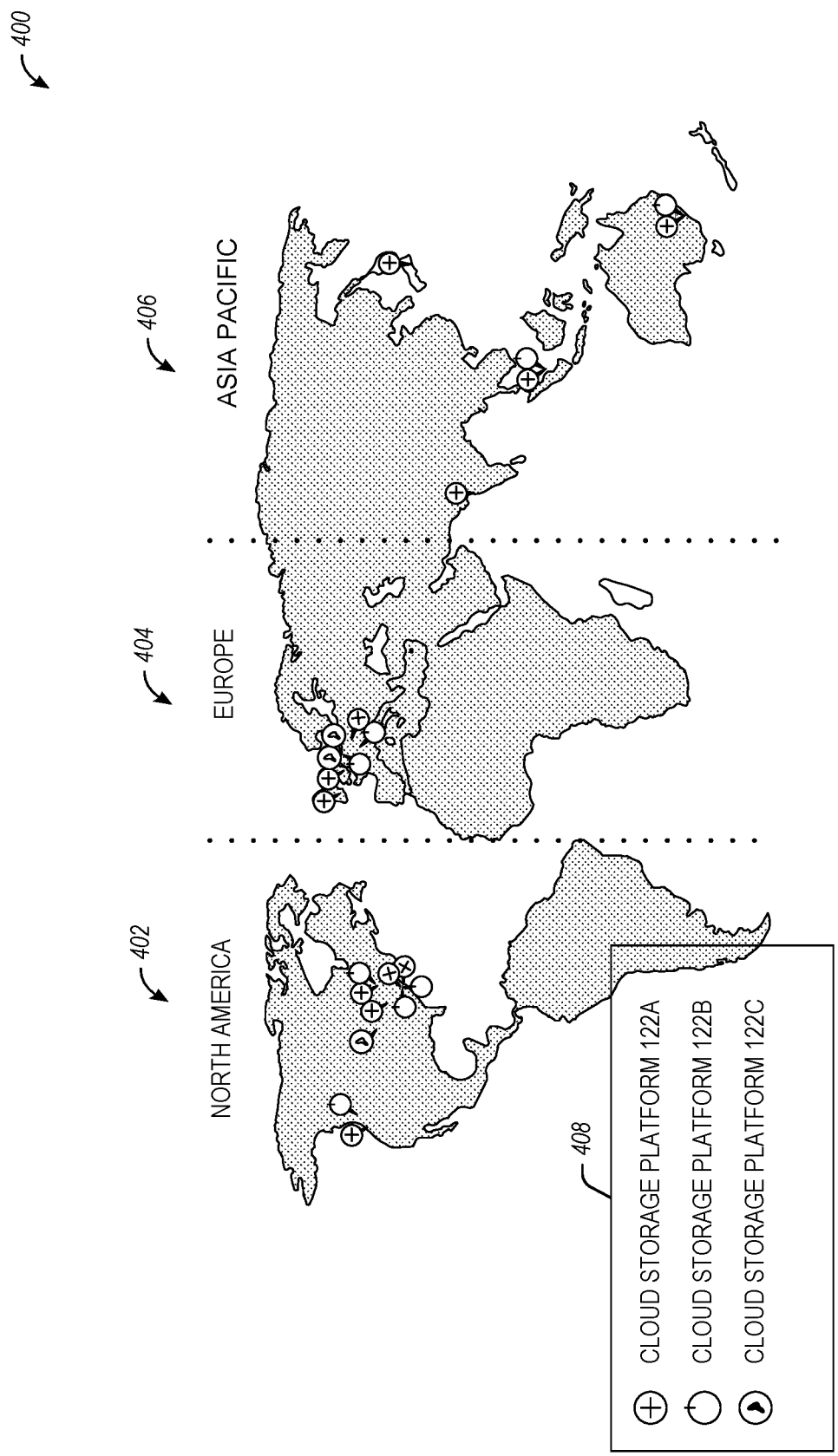
FIG. 4 illustrates an example regional-deployment map for the example database system of FIG. 1, in accordance with some embodiments of the present disclosure.

FIG. 4 illustrates an example regional-deployment map 400 for the example database system of FIG. 1, in accordance with some embodiments of the present disclosure. The regional-deployment map 400 is presented purely by way of example and not limitation, as different numbers and/or boundaries of regions could be demarcated in different implementations. As can be seen in FIG. 4, the regional-deployment map 400 includes three example geographic regions: North American region 402, European region 404, and Asia Pacific region 406. Moreover, various instances of deployments of the network-based database system 102 are depicted on the regional-deployment map 400. A legend 408 shows symbols used for three different deployments of the network-based database system 102, including deployments that are hosted by the cloud-storage platform 122A, deployments hosted by the cloud-storage platform 122B, and deployments that are hosted by the cloud-storage platform 122C. Cloud-storage platforms 122A, 122B, and 122C can be collectively referred to as storage platforms 122, which are also illustrated in FIG. 1.

In some embodiments, one of the cloud-storage platforms 122A, 122B, and 122C includes (or hosts) a SoT deployment for one or more organization-level global data objects for a specified organization, and one or more of the cloud-storage platforms 122A, 122B, and 122C include (or host) one or more participant deployments that locally store copies of the one or more organization-level global data objects.

Figure 5:
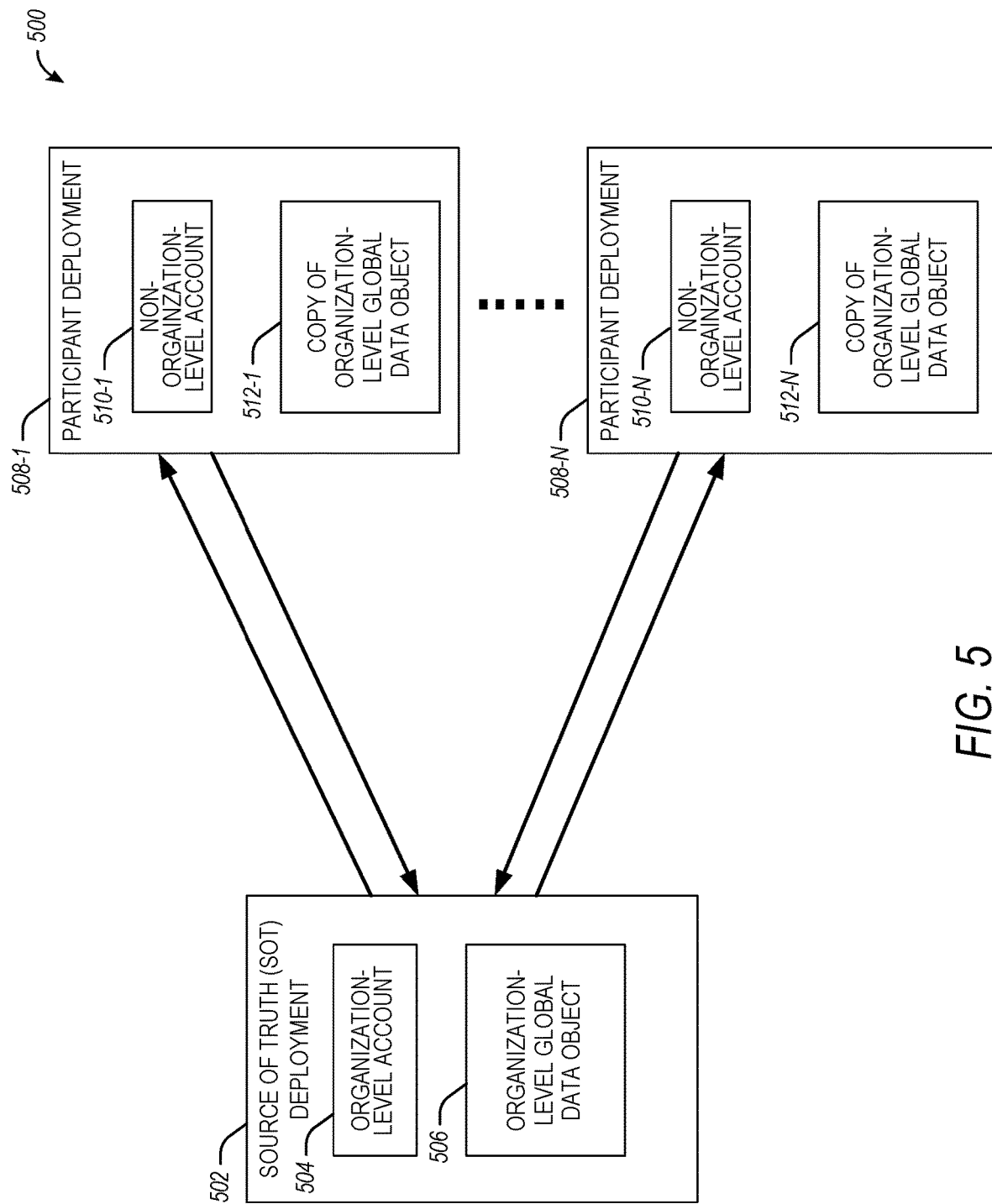
FIG. 5 is a diagram illustrating example arrangement of source of truth and participant deployments supporting one or more organization-level global data objects, in accordance with some embodiments of the present disclosure.

FIG. 5 is a diagram illustrating example arrangement 500 of SoT and participant deployments supporting one or more organization-level global data objects, in accordance with some embodiments of the present disclosure. The example arrangement 500 includes a SoT deployment 502 of the network-based database system 102 and multiple participant deployments 508-1 through 508-N (hereafter, participant deployments 508) of the network-based database system 102. As shown, an organization-level account 504 of a specific organization resides on a SoT deployment 502, while each of the participant deployments 508-1 through 508-N respectively include non-organization-level accounts 510-1 through 510-N of the specific organization. An organization-level global data object 506 of the specific organization is accessible by the organization-level account 504, and stored locally on the SoT deployment 502, which serves as a SoT for the organization-level global data object 506. In comparison, each of the participant deployments 508-1 through 508-N locally maintain (e.g., store) copies of the organization-level global data object 512-1 through 512-N, which accounts on those deployments can locally access as needed. For various embodiments, a copy of the organization-level global data object (e.g., 512-1) on a participant deployment (e.g., 508-1) exists outside of any account of the specific organization on the participant deployment but are accessible (e.g., read from) the organization-level global data object. Additionally, for some embodiments, a single copy of an organization-level global data object (e.g., 512-1) is maintained on a participant deployment (e.g., 508-1) and shared amongst two or more accounts of the specific organization on the participant deployment. While the organization-level global data object 506 is considered owned by the specific organization and accessible by the organization-level account 504, the organization-level global data object 506 is not necessarily owned by the organization-level account 504. As described herein, the SoT deployment 502 and the participant deployments 508 exchange request messages, response messages, and follow-up messages to manage (e.g., create, delete, modify/alter) one or more organization-level global data objects of a specified organization. A request for an organization-level global data object change (e.g., create, delete, modify/alter) with respect to an organization-level global data object can originate on or from the SoT deployment 502 or one of the participant deployments 508. For various embodiments, a request for an organization-level global data object change (for an organization-level global data object) is from a user of an account (e.g., an organization-level account or a non-organization-level account), where the user has a proper role, privileges, or organization access to request the organization-level global data object change (otherwise which the request could be ignored by the SoT deployment 502).

Figure 6:
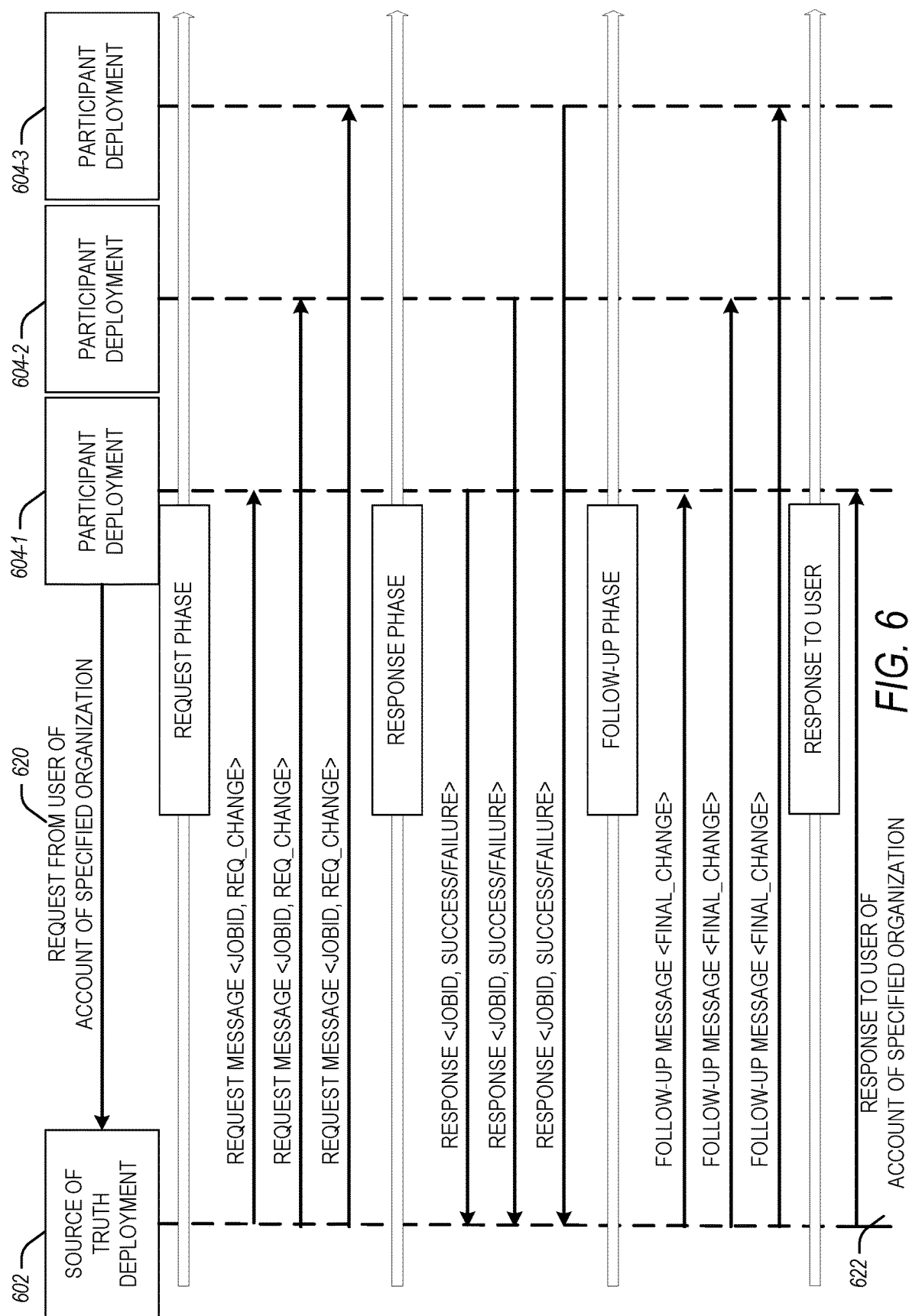
FIG. 6 is a diagram illustrating message interactions between a source of truth deployment and multiple participant deployments of a data platform that support an organization-level global data object, in accordance with some embodiments of the present disclosure.

FIG. 6 is a diagram illustrating message interactions between a SoT deployment and multiple participant deployments of a data platform that support an organization-level global data object, in accordance with some embodiments of the present disclosure. In FIG. 6, a SoT deployment 602 exchanges messages with participant deployments 604-1, 604-2, 604-3 to facilitate a change with respect to an organization-level global data object, such as creation, deletion, or modification of an organization-level global data object for a user of an organizational-level account associated with a specified organization.

As shown, the SoT deployment 602 receives, from the participant deployment 604-1, a request 620 from a user of an account (e.g., non-organization-level account) to perform an organization-level global data object change. For instance, the organization-level global data object change can comprise creation of a new organization-level global data object for a user in response to the request including a create user statement (e.g., in DDL or SQL). The organization-level global data object change can comprise modification of an organization-level global data object for a user in response to the request including an alter statement (e.g., in DDL or SQL) for the organization-level global data object. The organization-level global data object change can comprise deletion of an organization-level global data object for a user in response to the request including a delete statement (e.g., in DDL or SQL) for the organization-level global data object.

Where the organization-level global data object change comprises creation of a new organization-level global data object, the SoT deployment 602 can respond to the request 620 during a request phase by executing a create object statement included by the request 620, which can include deriving or parsing general global object information and object-specific details supplied by the user. The information can be validated to ensure that the new organization-level global data object proposed will be accepted on all deployments. The information can be placed into a new organization-level global data object (e.g., a new organization-level data persistent object (DPO)) that is generated in memory of the SoT deployment 602. Thereafter, the SoT deployment 602 generates a request message (e.g., global request message) that includes (e.g., in its message body) an identifier (JOBID) of a job on the SoT deployment 602 that initiated the requested organization-level global data object change—the creation of the new organization-level global data object. The request message can include (e.g., in its message body) information indicating the requested change (REQ_CHANGE), such as a flag that indicates that a creation operation is being requested. Additionally, the request message can include (e.g., in its message body) a copy of the new organization-level global data object (e.g., the new organization-level DPO) generated in the memory of the SoT deployment 602, so that each participant deployment can locally save a copy of the new organization-level global data object. The SoT deployment 602 determines that a set of participant deployments will receive the generated request message, where the set of participant deployments includes the participant deployments 604-1, 604-2, 604-3. The SoT deployment 602 determines that a set of participant deployments can determine (e.g., identify) the participant deployments by querying for accounts of the organization, and deriving a set of deployment identifiers (IDs) from the query result. After the set of participant deployments is determined, the SoT deployment 602 sends the request message to each participant deployment in the set of participant deployments. Thereafter, the SoT deployment 602 determines whether a set of commit conditions is satisfied to determine whether the creation of the new organization-level global data object (e.g., the requested organization-level global data object change) should be committed as part of the SoT on the SoT deployment 602 (e.g., copied from the memory to a persistent storage that renders the new organization-level global data object as part of the SoT).

Where the SoT deployment 602 is configured to commit changes only after a quorum of successful responses are reached, during the response phase, the SoT deployment 602 can start monitoring (e.g., start a watch process) for responses from the set of participant deployments (e.g., the participant deployments 604-1, 604-2, 604-3) and determine when a specific number of successful responses (e.g., a quorum) has been received (e.g., quorum can be defined as a simple majority). The response from an individual participant deployment can include (e.g., in its message body) the identifier (JOBID) of the job from the request message, and can further include (e.g., in its message body) information regarding (e.g., a flag indicating) whether writing of the new organization-level global data object on the individual participant deployment as a local copy was successful or a failure. To determine whether a quorum is reached, the SoT deployment 602 can receive a response message from a participant deployment, and an appropriate dispatch method can be triggered on the SoT deployment 602. The dispatch method can extract the body of the response message, where the body can include the identifier (JOBID) of the job corresponding to the request message, and a status flag indicating whether an operation relating to the change requested by the request message (e.g., writing of the new organization-level global data object on the participant deployment) was successful. If the job corresponding to the JOBID is still 'pending' on the SoT deployment 602, a counter tied to the pending job is increased by one if the status flag of the response indicates 'success' and not incremented if the status flag indicates 'failure.' Based on the counter, if the SoT deployment 602 determines that the counter indicates a quorum has been reached (e.g., the counter is greater than or equal to a threshold representing a quorum value) prior to timeout of a configurable monitor/watch timer (e.g., set to second monitor/watch time), the SoT deployment 602 can determine that the set of commitment conditions is satisfied and can end the monitoring process (e.g., the watch process) being used to monitor for responses from participant deployment. If, however, the SoT deployment 602 determines, based on the counter, that the counter indicates a quorum has not been reached (e.g., the counter is less than a threshold representing a quorum value) prior to timeout of a configurable monitor/watch timer (e.g., set to 30 second monitor/watch time), the SoT deployment 602 can determine that the set of commitment conditions is not satisfied and can end the monitoring process (e.g., the watch process) being used to monitor for responses from participant deployments.

If the SoT deployment 602 determines that a quorum is not reached before a configurable monitor/watch time (e.g., 30 seconds), the new organization-level global data object is not committed as part of the SoT on the SoT deployment 602 and a follow-up message is sent to the set of participant deployments indicating that the new organization-level global data object should not be committed at the set of participant deployments. For any participant deployments that have already committed the new organization-level global data object in response to the request message, the follow-up message (indicating that new organization-level global data object should not be committed) can cause those participant deployments to delete the new organization-level global data object from the participant deployments. For any participant deployments that have not already committed the new organization-level global data object in response to the request message, the follow-up message (indicating that new organization-level global data object should not be committed) can prevent the new organization-level global data object from being committed at those participant deployments.

If the SoT deployment 602 determines that a quorum is reached before a configurable watch time (e.g., 30 seconds), the new organization-level global data object is committed locally on the SoT deployment 602 as part of the SoT on the SoT deployment 602. Additionally, the SoT deployment 602 sends a follow-up message to the set of participant deployments indicating that the new organization-level global data object should be committed at the set of participant deployments. For any participant deployments that have already committed the new organization-level global data object in response to the request message, the follow-up message (indicating that new organization-level global data object should be committed) can cause the new organization-level global data object to remain committed on those participant deployments. For any participant deployments that have not already committed the new organization-level global data object in response to the request message, the follow-up message (indicating that new organization-level global data object should be committed) can cause those participant deployments to commit the new organization-level global data object on those participant deployments.

If a response (e.g., indicating success or failure) is received from a participant deployment, the SoT deployment 602 can ignore the response. Additionally, after sending the follow-up message to the set of participant deployments, the SoT deployment 602 can send a response 622 or notification to the user on the participant deployment 604-1 indicating whether the request from the user (e.g., commitment of the new organization-level global data object on the SoT) was successful or a failure.

With respect to one of the participant deployments 604-1, 604-2, 604-3, upon receiving the request message, an appropriate dispatch method on the participant deployment can be triggered. The dispatch method can extract the body of the request message, where the body can include the identifier (JOBID) of the job on the SoT deployment 602 that initiated the requested organization-level global data object change (e.g., the creation of the new organization-level global data object). The body of the request message can also include a copy of the new organization-level global data object. The dispatch method can cause the new organization-level global data object to be written on the participant deployment. If the write operation is successful, the status of the change (requested by the request message) can be set to 'success,' and if the write operation fails (e.g., due to error or timeout), the status of the change (requested by the request message) can be set to 'failure.' The participant deployment can generate a response to the request message, and send the response to the SoT deployment 602, where the response can include the identifier (JOBID) of the job and a flag indicating the status of the change.

With respect to one of the participant deployments 604-1, 604-2, 604-3 and follow-up messages, upon receiving the follow-up message, an appropriate dispatch method on the participant deployment can be triggered. The dispatch method can extract the body of the follow-up message, where the body can include information indicating the final change (FINAL_CHANGE) performed (e.g., creation, deletion, or modification/alteration) with respect to the organization-level global data object. For instance, for the new organization-level global data object, if the follow-up message indicates the final change is to create the new organization-level global data object, the dispatch method of the participant deployment can cause the new organization-level global data object to be stored on the participant deployment if it has not been stored already. If, however the follow-up message indicates the final change is to not create (e.g., delete) the new organization-level global data object, the dispatch method of the participant deployment can cause the new organization-level global data object to be deleted from the participant deployment if it has not been deleted already.

While the foregoing describes messages with respect to creation of a new organization-level global data object, the contents of the messages can differ for different types of organization-level global data object changes. For instance, for creating a new organization-level global data object, the request messages can comprise the identifier (JOBID) of the job on the SoT deployment 602 that initiated the requested change, a copy of the new organization-level global data object, and information describing that creation of a new organization-level global data object is being requested (REQ_CHANGE). The response from participant deployments can comprise the identifier (JOBID) of the job on the SoT deployment 602 that initiated the requested change, and a flag (SUCCESS/FAILURE) indicating status of an operation performed on the participant deployment in connection with the requested change (e.g., writing a copy of the new organization-level global data object on the participant deployment). A follow-up message can comprise a copy of the new organization-level global data object, and information describing whether creation or deletion of the new organization-level global data object is being requested as a final change (FINAL_CHANGE).

In another instance, where an existing organization-level global data object is being deleted (e.g., dropped), the request messages can comprise the identifier (JOBID) of the job on the SoT deployment 602 that initiated the requested change, a copy of the existing organization-level global data object, and information describing that deletion of the existing organization-level global data object is being requested (REQ_CHANGE). The response from participant deployments can comprise the identifier (JOBID) of the job on the SoT deployment 602 that initiated the requested change, and a flag (SUCCESS/FAILURE) indicating status of an operation performed on the participant deployment in connection with the requested change (e.g., deletion of a copy of the existing organization-level global data object on the participant deployment). A follow-up message can comprise a copy of the existing organization-level global data object, and information describing whether deletion or creation of the existing organization-level global data object is being requested as a final change (FINAL_CHANGE). For example, the final change can be deletion if the deletion was successfully committed on the SoT deployment 602, which can cause the participant deployment to delete the existing organization-level global data object from the participant deployment if it is not deleted already. The final change can be creation if the deletion was not successfully committed on the SoT deployment 602, which can cause the participant deployment to store the existing organization-level global data object (from in the follow-up message) on the participant deployment if the existing organization-level global data object is no longer present on the participant deployment.

With respect to another instance, where an existing organization-level global data object is being modified (e.g., altered or edited), the request messages can comprise the identifier (JOBID) of the job on the SoT deployment 602 that initiated the requested change, a copy of an original version of the existing organization-level global data object, a copy of a modified/altered version of the existing organization-level global data object, and information describing that modification/alteration of the existing organization-level global data object is being requested (REQ_CHANGE). The modified/altered version of the existing organization-level global data object can be generated in memory of the SoT deployment 602 in response to a request (e.g., comprising new/modified value for the existing organization-level global data object) from a user to modify/alter the existing organization-level global data object. The copy of the original version of the existing organization-level global data object can assist the participant deployment in locating the original version of the existing organization-level global data object on the participant deployment, which once found can be replaced by the participant deployment with the copy of the modified/altered version of the existing organization-level global data object. The response from participant deployments can comprise the identifier (JOBID) of the job on the SoT deployment 602 that initiated the requested change, and a flag (SUCCESS/FAILURE) indicating status of an operation performed on the participant deployment in connection with the requested change (e.g., where replacement of the copy of the original version of the existing organization-level global data object on the participant deployment with the copy of the modified/altered version of the existing organization-level global data object was successful). A follow-up message can comprise a copy of an original version of the existing organization-level global data object, a copy of a modified/altered version of the existing organization-level global data object, and information describing whether a modification/alteration of the existing organization-level global data object is being requested as a final change, or reversion of the existing organization-level global data object to the original version is being requested as a final change (FINAL_CHANGE). The copy of the original version of the existing organization-level global data object can assist the participant deployment in locating the original version of the existing organization-level global data object on the participant deployment.

Continuing with the example of modifying/altering an existing organization-level global data object, if the final change is to modify/alter the existing organization-level global data object and the original version of the existing organization-level global data object is found to be still present on the participant deployment, the copy of the modified/altered version of the existing organization-level global data object (from the follow-up message) can be stored as a replacement to the original version of the existing organization-level global data object on the participant deployment. If the original version is not present on the participant deployment and the modified/altered version cannot be found, an incident can be generated (e.g., on the participant deployment) to indicate there is a mismatch between deployments, and the modified/altered version can be stored on the participant deployment to avoid lack of information issues on the participant deployment. If the final change is to revert the existing organization-level global data object to the original version and the original version of the existing organization-level global data object is found to be still present on the participant deployment, nothing may be performed on the participant deployment. However, if the final change is to revert the existing organization-level global data object to the original version and the modified/altered version of the existing organization-level global data object is found to be present on the participant deployment, the copy of the original version of the existing organization-level global data object (from the follow-up message) can be stored as a replacement to the modified/altered version of the existing organization-level global data object on the participant deployment. Alternatively, if the modified/altered version is not present on the participant deployment and the original version cannot be found, an incident can be generated (e.g., on the participant deployment) to indicate there is a mismatch between deployments, and the original version can be stored on the participant deployment to avoid lack of information issues on the participant deployment.

Figure 7:
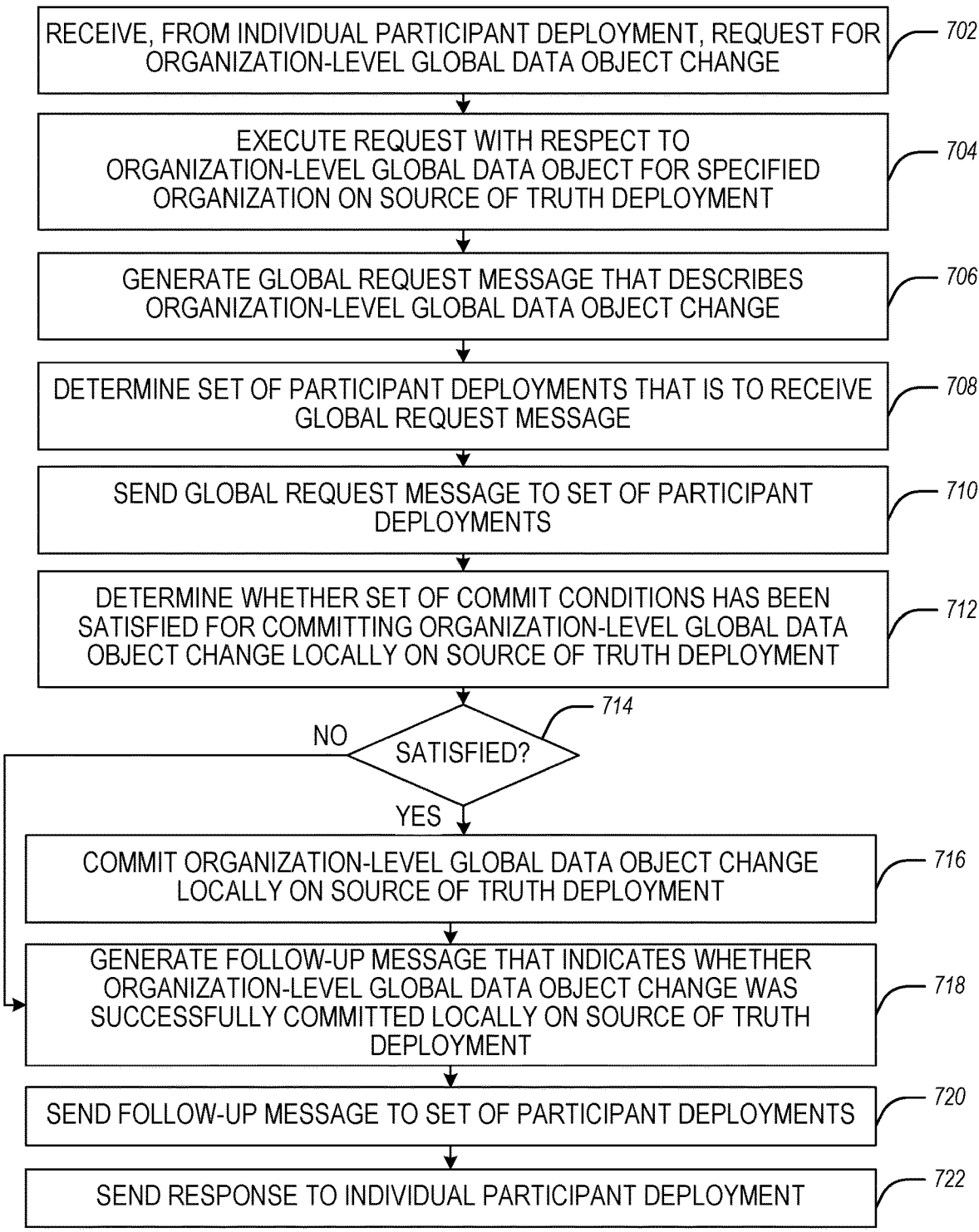
FIG. 7 is a flow diagram illustrating the operations of a database system in performing a method for organization-level global data objects, in accordance with some embodiments of the present disclosure.

FIG. 7 is a flow diagram illustrating the operations of a database system in performing method 700 for organization-level global data objects, in accordance with some embodiments of the present disclosure. Method 700 may be embodied in computer-readable instructions for execution by one or more hardware components (e.g., one or more processors) such that the operations of method 700 may be performed by components of the network-based database system 102, such as a network node (e.g., the organization-level global data object manager 132 executing on a network node of the compute service manager 108) or computing device (e.g., client device 114) which may be implemented as machine 800 of FIG. 8 and may be configured with an application connector performing the disclosed functions. Accordingly, method 700 is described below, by way of example with reference thereto. However, it shall be appreciated that method 700 may be deployed on various other hardware configurations and is not intended to be limited to deployment within the network-based database system 102.

At operation 702, a request (e.g., 620) for an organization-level global data object change is received at a SoT deployment (e.g., 602) from an individual participant deployment (e.g., 604-1) having at least one account of a specified organization. For some embodiments, the request is from a user of the at least one account that has an appropriate privilege, role, or access to execute the organization-level global data object change for the specified organization. The organization-level global data object change can comprise, for example, creating a new organization-level global data object, deleting an existing organization-level global data object, or editing at least some portion of an existing organization-level global data object. Depending on the embodiment, an organization-level global data object (upon which the organization-level global data object change is applied) can comprise a data object for a table, a schema, a view, a stream, a task, a user, or a role.

At operation 704, the request received at operation 702 is executed on the SoT deployment (e.g., 602) with respect to an organization-level global data object for the specified organization. For instance, if the request is to create a new organization-level global data object (e.g., a new organization-level DPO for a new user), at operation 704, the organization-level global data object for the specified organization can be created (e.g., generated) on the SoT deployment, and can be created based data/information provided by the request received at operation 702. When the new organization-level global data object is created, it can be created in memory of the SoT deployment and still be pending commitment to the SoT. In another instance, if the request is to delete an existing organization-level global data object (e.g., an existing organization-level DPO for an existing user), at operation 704, the existing organization-level global data object can be deleted or marked for deletion (pending a commitment). In an additional instance, if the request is to modify/alter an existing organization-level global data object (e.g., an existing organization-level DPO for an existing user), at operation 704, a modified/altered version of the existing organization-level global data object can be generated, and can be generated on memory of the SoT deployment and still be pending commitment to the SoT.

At operation 706, a request message (e.g., global request message) is generated on the SoT deployment (e.g., 602), where the request message describes the organization-level global data object change (e.g., creation of a new organization-level global data object, deletion of an existing organization-level global data object, modification/alteration of an existing organization-level global data object) based on the request received at operation 702.

At operation 708, a set of participant deployments (e.g., 604) that is to receive the request message (generated at operation 706) is determined by the SoT deployment (e.g., 602). According to some embodiments, each participant deployment in the set of participant deployments has at least one account of the specified organization. Depending on the embodiment, the SoT deployment can determine the set of participant deployments by querying for accounts of the specific organization, and determining a set of deployment IDs for those deployments that include accounts listed in the query result. The performance of operation 708 can account for changes over time in which deployments are considered to be participant deployments. Eventually, at operation 710, the request message, generated at operation 706, is sent to the set of participant deployments (e.g., all current participant deployments) determined at operation 708.

After operation 710, at operation 712, the SoT deployment (e.g., 602) determines whether a set of commit conditions has been satisfied for committing the organization-level global data object change locally on the SoT deployment. At decision point 714, if the SoT deployment determines that the set of commit conditions has been satisfied, the method 700 proceeds to operation 716; otherwise, the method 700 proceeds to operation 718.

According to some embodiments, operation 712 comprises the SoT deployment (e.g., 602) monitoring for responses, from the set of participant deployments (e.g., 604), to the request message. For some embodiments, at least one of the responses comprises an individual response from an individual participant deployment, where the individual response indicates whether the individual participant deployment successfully committed (or successfully performed an operation in connection with committing) the organization-level global data object change locally on the individual participant deployment. Based on a set of responses received by the SoT deployment from one or more of the set of participant deployments, the SoT deployment can determine whether, within a predetermined amount of time (e.g., after the global request message is transmitted to the set of participant deployments or after the monitoring begins), the SoT deployment has received at least a specific number of responses (e.g., a quorum of responses) that indicate that the organization-level global data object change was successfully committed locally on participant deployments. In response to determining that at least a specific number of responses (e.g., successful responses) has been received by the SoT deployment within a predetermined amount of time, the SoT deployment can determine that the set of commit conditions has been satisfied. However, in response to determining that at least the specific number of responses (e.g., successful responses) has been received by the SoT deployment within a predetermined amount of time, the SoT deployment can determine that the set of commit conditions has not been satisfied.

At operation 716, the organization-level global data object change is committed locally on the SoT deployment (e.g., 602). According to some embodiments, committing the organization-level global data object change on the SoT deployment commits the organization-level global data object change as part of the SoT. For some embodiments, the commitment of the organization-level global data object change on the SoT deployment commits the organization-level global data object change to the SoT. During commitment of the organization-level global data object change that comprises creation of a new organization-level global data object, the new organization-level global data object generated on memory of the SoT deployment can be moved from the memory to persistent data storage of the SoT deployment. During commitment of the organization-level global data object change that comprises deletion of an existing organization-level global data object, the existing organization-level global data object can be deleted from (or marked for deletion on) persistent data storage of the SoT deployment. During commitment of the organization-level global data object change that comprises modification/alteration of an existing organization-level global data object, a modified/altered version of the existing organization-level global data object can replace an original version of the existing organization-level global data object (e.g., replaced on persistent data storage of the SoT deployment).

At operation 718, the SoT deployment (e.g., 602) generates a follow-up message that indicates whether the organization-level global data object change was successfully committed locally on the SoT deployment. For instance, after the SoT deployment commits the organization-level global data object change locally on the SoT deployment at operation 716, at operation 718, the follow-up message is generated to indicate that the organization-level global data object change was successfully committed locally on the SoT deployment. However, if at decision point 714, the SoT deployment determines that the set of commit conditions has not been satisfied, then the follow-up message is generated to indicate that the organization-level global data object change was not successfully committed locally on the SoT deployment. Thereafter, at operation 720, the SoT deployment sends the follow-up message generated at operation 718 to the set of participant deployments. Additionally, eventually, at operation 722, the SoT deployment sends a response the individual participant deployment that sent the request received at operation 702, where the response can indicate whether the request was successfully executed (e.g., based on the SoT deployment's determination of whether the set of commit conditions has been satisfied).

Figure 8:
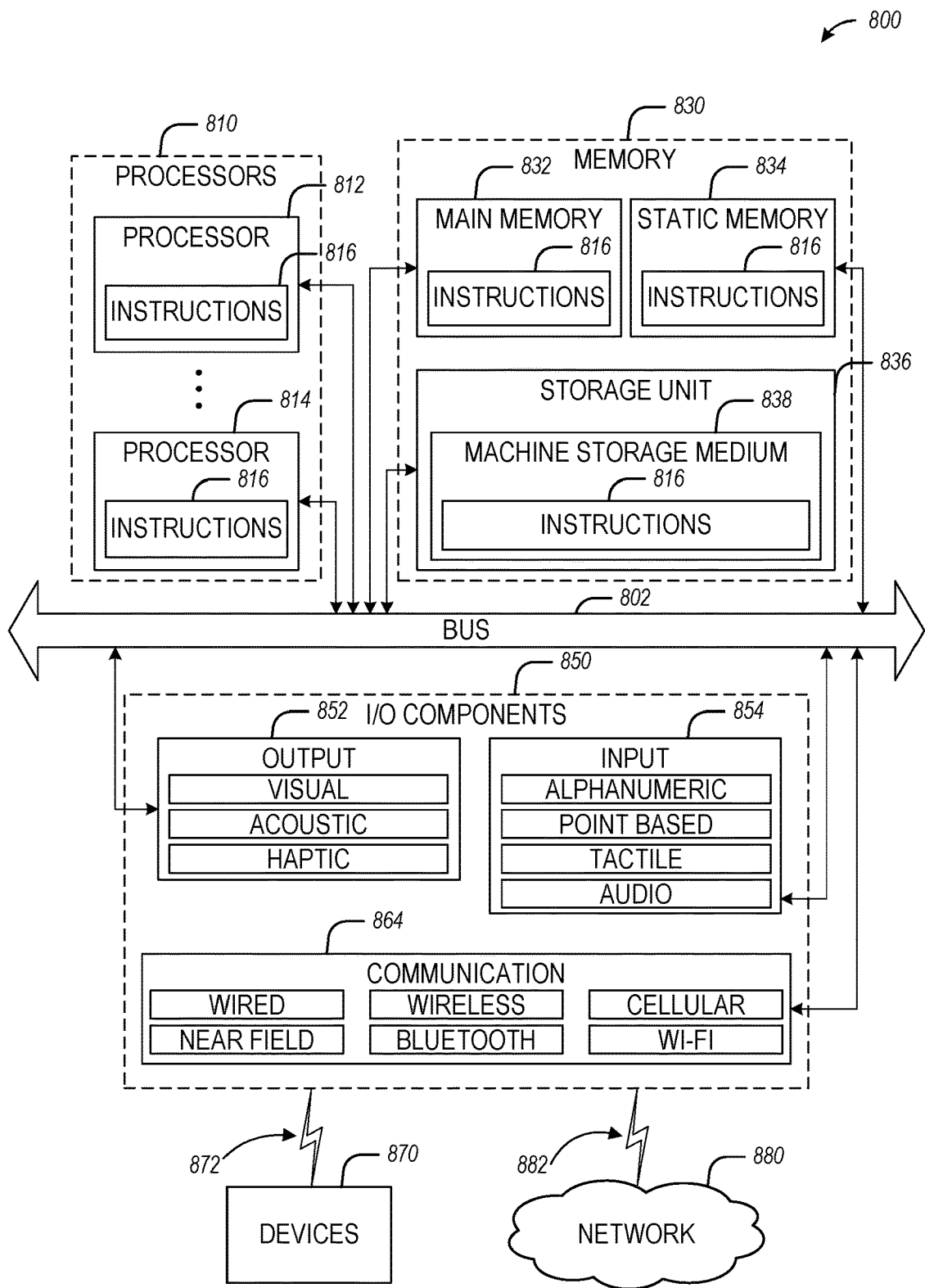
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of machine 800 in the example form of a computer system, within which instructions 816 (e.g., software, a program, an application, an applet, an app, or other executable code) for causing the machine 800 to perform any one or more of the methodologies discussed herein may be executed. For example, instructions 816 may cause machine 800 to execute any one or more operations of method 700 (or any other technique discussed herein, for example in connection with FIG. 4-FIG. 7). As another example, instructions 816 may cause machine 800 to implement one or more portions of the functionalities discussed herein. In this way, instructions 816 may transform a general, non-programmed machine into a particular machine 800 (e.g., the client device 114, the compute service manager 108, or a node in the execution platform 110) that is specially configured to carry out any one of the described and illustrated functions in the manner described herein. In yet another embodiment, instructions 816 may configure the client device 114, the compute service manager 108, and/or a node in the execution platform 110 to carry out any one of the described and illustrated functions in the manner described herein.

In alternative embodiments, the machine 800 operates as a standalone device or may be coupled (e.g., networked) to other machines. In a networked deployment, machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

Machine 800 includes processors 810, memory 830, and input/output (I/O) components 850 configured to communicate with each other such as via a bus 802. In some example embodiments, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within machine storage medium 838 of the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with network 880. In further examples, communication components 864 may include wired communication components, wireless communication components, cellular communication components, and other communication components to provide communication via other modalities. The device 870 may be another machine or any of a wide variety of peripheral devices (e.g., a peripheral device coupled via a universal serial bus (USB)). For example, as noted above, machine 800 may correspond to any one of the client device 114, the compute service manager 108, or the execution platform 110, and the devices 870 may include the client device 114 or any other computing device described herein as being in communication with the network-based database system 102 or the storage platform 104.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 880 or a portion of network 880 may include a wireless or cellular network, and coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of several well-known transfer protocols (e.g., hypertext transfer protocol (HTTP)). Similarly, instructions 816 may be transmitted or received using a transmission medium via coupling 872 (e.g., a peer-to-peer coupling or another type of wired or wireless network coupling) to device 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and includes digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: a source of truth deployment, the source of truth deployment comprising: a set of hardware processors; and memory storing instructions that cause the set of hardware processors to perform operations comprising: creating an organization-level global data object for a specified organization on the source of truth deployment; generating a request message that describes an organization-level global data object change, the organization-level global data object change comprising creation of the organization-level global data object; determining a set of participant deployments that is to receive the request message, each participant deployment in the set of participant deployments having at least one account of the specified organization; sending the request message to the set of participant deployments; based on sending of the request message to the set of participant deployments, determining whether a set of commit conditions has been satisfied for committing the organization-level global data object change locally on the source of truth deployment; and in response to determining that the set of commit conditions has been satisfied for committing the organization-level global data object change locally on the source of truth deployment, committing the organization-level global data object change locally on the source of truth deployment.

In Example 2, the subject matter of Example 1 includes, wherein the operations comprise receiving, from an individual participant deployment having at least one account of the specified organization, a request for the organization-level global data object change, the request being from a user of the at least one account that has an appropriate privilege to execute the organization-level global data object change.

In Example 3, the subject matter of Example 2 includes, wherein the operations comprise sending a response to the individual participant deployment, the response indicating whether the request was successfully executed based on the determining of whether the set of commit conditions has been satisfied.

In Example 4, the subject matter of Examples 1-3 includes, wherein the determining of whether the set of commit conditions has been satisfied comprises: monitoring for responses, from the set of participant deployments, to the request message, at least one of the responses comprising an individual response from an individual participant deployment indicating whether the individual participant deployment successfully committed the organization-level global data object change locally on the individual participant deployment; based on a set of responses received from one or more of the set of participant deployments, determining whether, within a predetermined amount of time, at least a specific number of responses have been received that indicate that the organization-level global data object change was successfully committed locally on participant deployments; and in response to determining that at least the specific number of responses has been received within the predetermined amount of time, determining that the set of commit conditions has been satisfied.

In Example 5, the subject matter of Example 4 includes, wherein the determining of whether the set of commit conditions has been satisfied comprises in response to determining that at least the specific number of responses has been received within the predetermined amount of time, determining that the set of commit conditions has not been satisfied.

In Example 6, the subject matter of Examples 1-5 includes, wherein the operations comprise: based on committing of the organization-level global data object change locally on the source of truth deployment: generating a follow-up message that indicates that the organization-level global data object change was successfully committed locally on the source of truth deployment; and sending the follow-up message to the set of participant deployments.

In Example 7, the subject matter of Examples 1-6 includes, wherein the operations comprise: in response to determining that the set of commit conditions has not been satisfied: generating a follow-up message that indicates that the organization-level global data object change was not successfully committed locally on the source of truth deployment; and sending the follow-up message to the set of participant deployments.

In Example 8, the subject matter of Examples 1-7 includes, wherein the set of hardware processors is a first set of hardware processors, wherein the memory is first memory, and wherein the system comprises: an individual participant deployment of the set of participant deployments, the individual participant deployment comprising: a second set of hardware processors; and second memory storing instructions that cause the second set of hardware processors to perform operations comprising: receiving the request message from the source of truth deployment; attempting to commit the organization-level global data object change locally on the individual participant deployment; generating an individual response to the request message, the individual response indicating whether the individual participant deployment successfully committed the organization-level global data object change locally on the individual participant deployment; and sending the individual response to the source of truth deployment.

In Example 9, the subject matter of Example 8 includes, wherein operations of the individual participant deployment comprise: receiving, from the source of truth deployment, a follow-up message that indicates whether the organization-level global data object change was successfully committed locally on the source of truth deployment; and in response to the follow-up message indicating that the organization-level global data object change was successfully committed locally on the source of truth deployment, leaving a local commitment of the organization-level global data object change on the individual participant deployment.

In Example 10, the subject matter of Examples 8-9 includes, wherein operations of the individual participant deployment comprise: receiving, from the source of truth deployment, a follow-up message that indicates whether the organization-level global data object change was successfully committed locally on the source of truth deployment; and in response to the follow-up message indicating that the organization-level global data object change was not successfully committed locally on the source of truth deployment, reversing a commitment of the organization-level global data object change on the individual participant deployment.

In Example 11, the subject matter of Examples 1-10 includes, wherein the organization-level global data object change is a first organization-level global data object change, wherein the request message is a first request message, wherein the set of participant deployments is a first set of participant deployments, and wherein the operations comprise: based on committing of the first organization-level global data object change locally on the source of truth deployment: receiving, from an individual participant deployment having at least one account of the specified organization, a request for a second organization-level global data object change to the organization-level global data object, the request being from a user of the at least one account that has an appropriate privilege to execute the second organization-level global data object change, the second organization-level global data object change comprising one of editing organization-level global data object or deleting the organization-level global data object; generating a second request message that describes the second organization-level global data object change to the organization-level global data object; determining a second set of participant deployments that is to receive the second request message, each participant deployment in the second set of participant deployments having at least one account of the specified organization; sending the second request message to the second set of participant deployments; based on the sending of the second request message to the second set of participant deployments, determining whether the set of commit conditions has been satisfied for committing the second organization-level global data object change locally on the source of truth deployment; and in response to determining that the set of commit conditions has been satisfied for committing the second organization-level global data object change locally on the source of truth deployment, committing the second organization-level global data object change locally on the source of truth deployment.

Example 12 is at least one machine-storage medium including instructions that, when executed by processing circuitry, cause the processing circuitry to perform operations to implement of any of Examples 1-11.

Example 13 is an apparatus comprising means to implement of any of Examples 1-11.

Example 14 is a method to implement of any of Examples 1-11.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
    a source of truth deployment, the source of truth deployment comprising:
        a set of hardware processors; and
        memory storing instructions that cause the set of hardware processors to perform operations comprising:
            creating an organization-level global data object for a specified organization on the source of truth deployment;
            generating a request message that describes an organization-level global data object change, the organization-level global data object change comprising creation of the organization-level global data object;
            determining a set of participant deployments that is to receive the request message, each participant deployment in the set of participant deployments having at least one account of the specified organization;
            sending the request message to the set of participant deployments;
            after the sending of the request message to the set of participant deployments, determining whether a set of commit conditions has been satisfied for committing the organization-level global data object change locally on the source of truth deployment; and
            in response to determining that the set of commit conditions has been satisfied for committing the organization-level global data object change locally on the source of truth deployment, committing the organization-level global data object change locally on the source of truth deployment.

2. The system of claim 1, wherein the operations comprise:
    receiving, from an individual participant deployment having at least one account of the specified organization, a request for the organization-level global data object change, the request being from a user of the at least one account that has an appropriate privilege to execute the organization-level global data object change.

3. The system of claim 2, wherein the operations comprise:
    sending a response to the individual participant deployment, the response indicating whether the request was successfully executed based on the determining of whether the set of commit conditions has been satisfied.

4. The system of claim 1, wherein the determining of whether the set of commit conditions has been satisfied comprises:
    monitoring for responses, from the set of participant deployments, to the request message, at least one of the responses comprising an individual response from an individual participant deployment indicating whether the individual participant deployment successfully committed the organization-level global data object change locally on the individual participant deployment;
    based on a set of responses received from one or more of the set of participant deployments, determining whether, within a predetermined amount of time, at least a specific number of responses have been received that indicate that the organization-level global data object change was successfully committed locally on participant deployments; and
    in response to determining that at least the specific number of responses has been received within the predetermined amount of time, determining that the set of commit conditions has been satisfied.

5. The system of claim 4, wherein the determining of whether the set of commit conditions has been satisfied comprises:
    in response to determining that at least the specific number of responses has been received within the predetermined amount of time, determining that the set of commit conditions has not been satisfied.

6. The system of claim 1, wherein the operations comprise:
    after the committing of the organization-level global data object change locally on the source of truth deployment:
        generating a follow-up message that indicates that the organization-level global data object change was successfully committed locally on the source of truth deployment; and
        sending the follow-up message to the set of participant deployments.

7. The system of claim 1, wherein the operations comprise:
    in response to determining that the set of commit conditions has not been satisfied:
        generating a follow-up message that indicates that the organization-level global data object change was not successfully committed locally on the source of truth deployment; and
        sending the follow-up message to the set of participant deployments.

8. The system of claim 1, wherein the set of hardware processors is a first set of hardware processors, wherein the memory is first memory, and wherein the system comprises:
    an individual participant deployment of the set of participant deployments, the individual participant deployment comprising:
        a second set of hardware processors; and
        second memory storing instructions that cause the second set of hardware processors to perform operations comprising:
            receiving the request message from the source of truth deployment;

attempting to commit the organization-level global data object change locally on the individual participant deployment;

generating an individual response to the request message, the individual response indicating whether the individual participant deployment successfully committed the organization-level global data object change locally on the individual participant deployment; and sending the individual response to the source of truth deployment.

9. The system of claim 8, wherein operations of the individual participant deployment comprise:

receiving, from the source of truth deployment, a follow-up message that indicates whether the organization-level global data object change was successfully committed locally on the source of truth deployment; and in response to the follow-up message indicating that the organization-level global data object change was successfully committed locally on the source of truth deployment, leaving a local commitment of the organization-level global data object change on the individual participant deployment.

10. The system of claim 8, wherein operations of the individual participant deployment comprise:

receiving, from the source of truth deployment, a follow-up message that indicates whether the organization-level global data object change was successfully committed locally on the source of truth deployment; and in response to the follow-up message indicating that the organization-level global data object change was not successfully committed locally on the source of truth deployment, reversing a commitment of the organization-level global data object change on the individual participant deployment.

11. The system of claim 1, wherein the organization-level global data object change is a first organization-level global data object change, wherein the request message is a first request message, wherein the set of participant deployments is a first set of participant deployments, and wherein the operations comprise:

after the committing of the first organization-level global data object change locally on the source of truth deployment:

receiving, from an individual participant deployment having at least one account of the specified organization, a request for a second organization-level global data object change to the organization-level global data object, the request being from a user of the at least one account that has an appropriate privilege to execute the second organization-level global data object change, the second organization-level global data object change comprising one of editing the organization-level global data object or deleting the organization-level global data object;

generating a second request message that describes the second organization-level global data object change to the organization-level global data object;

determining a second set of participant deployments that is to receive the second request message, each participant deployment in the second set of participant deployments having at least one account of the specified organization;

sending the second request message to the second set of participant deployments;

after the sending of the second request message to the second set of participant deployments, determining whether the set of commit conditions has been satisfied for committing the second organization-level global data object change locally on the source of truth deployment; and in response to determining that the set of commit conditions has been satisfied for committing the second organization-level global data object change locally on the source of truth deployment, committing the second organization-level global data object change locally on the source of truth deployment.

12. A method comprising:

creating, by a source of truth deployment, an organization-level global data object for a specified organization on the source of truth deployment;

generating, by the source of truth deployment, a request message that describes an organization-level global data object change, the organization-level global data object change comprising creation of the organization-level global data object;

determining, by the source of truth deployment, a set of participant deployments that is to receive the request message, each participant deployment in the set of participant deployments having at least one account of the specified organization;

sending, from the source of truth deployment, the request message to the set of participant deployments;

after the sending of the request message to the set of participant deployments, determining, by the source of truth deployment, whether a set of commit conditions has been satisfied for committing the organization-level global data object change locally on the source of truth deployment; and in response to determining that the set of commit conditions has been satisfied for committing the organization-level global data object change locally on the source of truth deployment, committing, by the source of truth deployment, the organization-level global data object change locally on the source of truth deployment.

13. The method of claim 12, comprising:

receiving at the source of truth deployment, from an individual participant deployment having at least one account of the specified organization, a request for the organization-level global data object change, the request being from a user of the at least one account that has an appropriate privilege to execute the organization-level global data object change.

14. The method of claim 13, comprising:

sending, from the source of truth deployment, a response to the individual participant deployment, the response indicating whether the request was successfully executed based on the determining of whether the set of commit conditions has been satisfied.

15. The method of claim 12, wherein the determining of whether the set of commit conditions has been satisfied comprises:

monitoring for responses, from the set of participant deployments, to the request message, at least one of the responses comprising an individual response from an individual participant deployment indicating whether the individual participant deployment successfully committed the organization-level global data object change locally on the individual participant deployment;

based on a set of responses received from one or more of the set of participant deployments, determining whether, within a predetermined amount of time, at least a specific number of responses have been received that indicate that the organization-level global data object change was successfully committed locally on participant deployments; and in response to determining that at least the specific number of responses has been received within the predetermined amount of time, determining that the set of commit conditions has been satisfied.

16. The method of claim 15, wherein the determining of whether the set of commit conditions has been satisfied comprises:

in response to determining that at least the specific number of responses has been received within the predetermined amount of time, determining that the set of commit conditions has not been satisfied.

17. The method of claim 12, comprising:

after the committing of the organization-level global data object change locally on the source of truth deployment:

generating, by the source of truth deployment, a follow-up message that indicates that the organization-level global data object change was successfully committed locally on the source of truth deployment; and sending, from the source of truth deployment, the follow-up message to the set of participant deployments.

18. The method of claim 12, comprising:

in response to determining that the set of commit conditions has not been satisfied:

generating, by the source of truth deployment, a follow-up message that indicates that the organization-level global data object change was not successfully committed locally on the source of truth deployment; and sending, from the source of truth deployment, the follow-up message to the set of participant deployments.

19. The method of claim 12, comprising:

receiving, at an individual participant deployment of the set of participant deployments, the request message from the source of truth deployment;

attempting, by the individual participant deployment, to commit the organization-level global data object change locally on the individual participant deployment;

generating, by the individual participant deployment, an individual response to the request message, the individual response indicating whether the individual participant deployment successfully committed the organization-level global data object change locally on the individual participant deployment; and sending, from the individual participant deployment, the individual response to the source of truth deployment.

20. The method of claim 19, comprising:

receiving at the individual participant deployment, from the source of truth deployment, a follow-up message that indicates whether the organization-level global data object change was successfully committed locally on the source of truth deployment; and in response to the follow-up message indicating that the organization-level global data object change was successfully committed locally on the source of truth deployment, leaving, by the individual participant deployment, a local commitment of the organization-level global data object change on the individual participant deployment.

21. The method of claim 19, comprising:

receiving at the individual participant deployment, from the source of truth deployment, a follow-up message that indicates whether the organization-level global data object change was successfully committed locally on the source of truth deployment; and in response to the follow-up message indicating that the organization-level global data object change was not successfully committed locally on the source of truth deployment, reversing, by the individual participant deployment, a commitment of the organization-level global data object change on the individual participant deployment.

22. The method of claim 12, wherein the organization-level global data object change is a first organization-level global data object change, wherein the request message is a first request message, wherein the set of participant deployments is a first set of participant deployments, and the method comprises:

after the committing of the first organization-level global data object change locally on the source of truth deployment:

receiving at the source of truth deployment, from an individual participant deployment having at least one account of the specified organization, a request for a second organization-level global data object change to the organization-level global data object, the request being from a user of the at least one account that has an appropriate privilege to execute the second organization-level global data object change, the second organization-level global data object change comprising one of editing organization-level global data object or deleting the organization-level global data object;

generating, by the source of truth deployment, a second request message that describes the second organization-level global data object change to the organization-level global data object;

determining, by the source of truth deployment, a second set of participant deployments to receive the second request message, each participant deployment in the second set of participant deployments having at least one account of the specified organization;

sending, from the source of truth deployment, the second request message to the second set of participant deployments;

after the sending of the second request message to the second set of participant deployments, determining, by the source of truth deployment, whether the set of commit conditions has been satisfied for committing the second organization-level global data object change locally on the source of truth deployment; and in response to determining that the set of commit conditions has been satisfied for committing the second organization-level global data object change locally on the source of truth deployment, committing, by the source of truth deployment, the second organization-level global data object change locally on the source of truth deployment.

23. A machine-storage medium comprising instructions that, when executed by one or more hardware processors associated with a source of truth deployment, configure the source of truth deployment to perform operations comprising:

creating an organization-level global data object for a specified organization on the source of truth deployment;

generating a request message that describes an organization-level global data object change, the organization-level global data object change comprising creation of the organization-level global data object;

determining a set of participant deployments to receive the request message, each participant deployment in the set of participant deployments having at least one account of the specified organization;

sending the request message to the set of participant deployments;

after the sending of the request message to the set of participant deployments, determining whether a set of commit conditions has been satisfied for committing the organization-level global data object change locally on the source of truth deployment; and in response to determining that the set of commit conditions has been satisfied for committing the organization-level global data object change locally on the source of truth deployment, committing the organization-level global data object change locally on the source of truth deployment.

24. The machine-storage medium of claim 23, wherein the operations comprise:

receiving, from an individual participant deployment having at least one account of the specified organization, a request for the organization-level global data object change, the request being from a user of the at least one account that has an appropriate privilege to execute the organization-level global data object change.

25. The machine-storage medium of claim 24, wherein the operations comprise:

sending a response to the individual participant deployment, the response indicating whether the request was successfully executed based on the determining of whether the set of commit conditions has been satisfied.

26. The machine-storage medium of claim 23, wherein the determining of whether the set of commit conditions has been satisfied comprises:

monitoring for responses, from the set of participant deployments, to the request message, at least one of the responses comprising an individual response from an individual participant deployment indicating whether the individual participant deployment successfully committed the organization-level global data object change locally on the individual participant deployment;

based on a set of responses received from one or more of the set of participant deployments, determining whether, within a predetermined amount of time, at least a specific number of responses have been received that indicate that the organization-level global data object change was successfully committed locally on participant deployments; and in response to determining that at least the specific number of responses has been received within the predetermined amount of time, determining that the set of commit conditions has been satisfied.

27. The machine-storage medium of claim 26, wherein the determining of whether the set of commit conditions has been satisfied comprises:

in response to determining that at least the specific number of responses has been received within the predetermined amount of time, determining that the set of commit conditions has not been satisfied.

28. The machine-storage medium of claim 23, wherein the operations comprise:

after the committing of the organization-level global data object change locally on the source of truth deployment:

generating a follow-up message that indicates that the organization-level global data object change was successfully committed locally on the source of truth deployment; and sending the follow-up message to the set of participant deployments.

29. The machine-storage medium of claim 23, wherein the operations comprise:

in response to determining that the set of commit conditions has not been satisfied:

generating a follow-up message that indicates that the organization-level global data object change was not successfully committed locally on the source of truth deployment; and sending the follow-up message to the set of participant deployments.

30. The machine-storage medium of claim 23, wherein the organization-level global data object change is a first organization-level global data object change, wherein the request message is a first request message, wherein the set of participant deployments is a first set of participant deployments, and wherein the operations comprise:

after the committing of the first organization-level global data object change locally on the source of truth deployment:

receiving, from an individual participant deployment having at least one account of the specified organization, a request for a second organization-level global data object change to the organization-level global data object, the request being from a user of the at least one account that has an appropriate privilege to execute the second organization-level global data object change, the second organization-level global data object change comprising one of editing organization-level global data object or deleting the organization-level global data object;

generating a second request message that describes the second organization-level global data object change to the organization-level global data object;

determining a second set of participant deployments to receive the second request message, each participant deployment in the second set of participant deployments having at least one account of the specified organization;

sending the second request message to the second set of participant deployments;

after the sending of the second request message to the second set of participant deployments, determining whether the set of commit conditions has been satisfied for committing the second organization-level global data object change locally on the source of truth deployment; and in response to determining that the set of commit conditions has been satisfied for committing the second organization-level global data object change locally on the source of truth deployment, committing the second organization-level global data object change locally on the source of truth deployment.

* * * * *